US012126282B2

United States Patent
Araki et al.

(10) Patent No.: US 12,126,282 B2
(45) Date of Patent: Oct. 22, 2024

(54) INVERTER CONTROL METHOD AND MOTOR CONTROL DEVICE

(71) Applicant: DAIKIN INDUSTRIES, LTD., Osaka (JP)

(72) Inventors: Takeshi Araki, Osaka (JP); Naoto Kobayashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 331 days.

(21) Appl. No.: 17/277,573

(22) PCT Filed: Sep. 2, 2019

(86) PCT No.: PCT/JP2019/034334
§ 371 (c)(1),
(2) Date: Mar. 18, 2021

(87) PCT Pub. No.: WO2020/059467
PCT Pub. Date: Mar. 26, 2020

(65) Prior Publication Data
US 2021/0359629 A1    Nov. 18, 2021

(30) Foreign Application Priority Data

Sep. 19, 2018    (JP) ................. 2018-174936

(51) Int. Cl.
*H02P 21/00* (2016.01)
*H02P 6/10* (2006.01)
(Continued)

(52) U.S. Cl.
CPC ............ *H02P 21/0089* (2013.01); *H02P 6/10* (2013.01); *H02P 21/05* (2013.01); *H02P 21/06* (2013.01);
(Continued)

(58) Field of Classification Search
CPC ........ H02P 21/0089; H02P 6/10; H02P 21/05; H02P 21/06; H02P 21/14; H02P 27/06; H02P 29/50; H02P 23/00
See application file for complete search history.

(56) References Cited

U.S. PATENT DOCUMENTS

2006/0108967 A1*  5/2006  Tanaka .................... H02P 21/22
                                                          318/712
2006/0125437 A1*  6/2006  Kitano .................... F04B 35/04
                                                          318/432
(Continued)

FOREIGN PATENT DOCUMENTS

CN           108712134 A  * 10/2018  .......... B60L 15/2045
EP            1257038 A1  * 11/2002  ............. F04B 35/04
(Continued)

OTHER PUBLICATIONS

International Search Report (PCT/ISA/210) issued in PCT/JP2019/034334, dated Dec. 3, 2019.
(Continued)

*Primary Examiner* — Bickey Dhakal
(74) *Attorney, Agent, or Firm* — Birch, Stewart, Kolasch & Birch, LLP

(57) ABSTRACT

An inverter control method is a method for controlling an inverter that outputs an application voltage, which is a voltage to be applied to a motor that drives a load by using rotation of a shaft. The method includes: causing the inverter to output the application voltage having an amplitude smaller than a first maximum and causing the motor to rotate at a first speed and drive the load which is predetermined; and causing the inverter to output the application voltage having an amplitude of a second maximum and causing the motor to rotate at a second speed and drive the predetermined load. The first maximum is a possible maximum value of an amplitude of the application voltage when the
(Continued)

motor drives the predetermined load at the first speed. The first speed is a maximum of a speed of rotation of the motor when the motor drives the predetermined load. The second maximum is a possible maximum value of the amplitude of the application voltage when the motor drives the predetermined load at the second speed. The second speed is lower than the first speed.

6 Claims, 22 Drawing Sheets

(51) Int. Cl.
  *H02P 21/05* (2006.01)
  *H02P 21/06* (2016.01)
  *H02P 21/14* (2016.01)
  *H02P 27/06* (2006.01)
  *H02P 29/50* (2016.01)

(52) U.S. Cl.
  CPC .............. *H02P 21/14* (2013.01); *H02P 27/06* (2013.01); *H02P 29/50* (2016.02)

(56) References Cited

U.S. PATENT DOCUMENTS

| | | | |
|---|---|---|---|
| 2015/0311835 | A1 | 10/2015 | Hara et al. |
| 2017/0085200 | A1* | 3/2017 | Campbell ............... H02P 27/06 |
| 2020/0406761 | A1* | 12/2020 | Hanaoka ............... H02P 23/009 |

FOREIGN PATENT DOCUMENTS

| | | | | |
|---|---|---|---|---|
| JP | 2011-24276 | A | | 2/2011 |
| JP | 2011024276 | A | * | 2/2011 |
| JP | 2013-219866 | A | | 10/2013 |
| JP | 2015128355 | A | * | 7/2015 |
| JP | 2015-211561 | A | | 11/2015 |

OTHER PUBLICATIONS

International Preliminary Report on Patentability and Written Opinion of the International Searching Authority for International Application No. PCT/JP2019/034334, dated Apr. 1, 2021, with an English translation.

Extended European Search Report issued Sep. 29, 2022 in corresponding European Application No. 19863569.0.

\* cited by examiner

F I G. 7
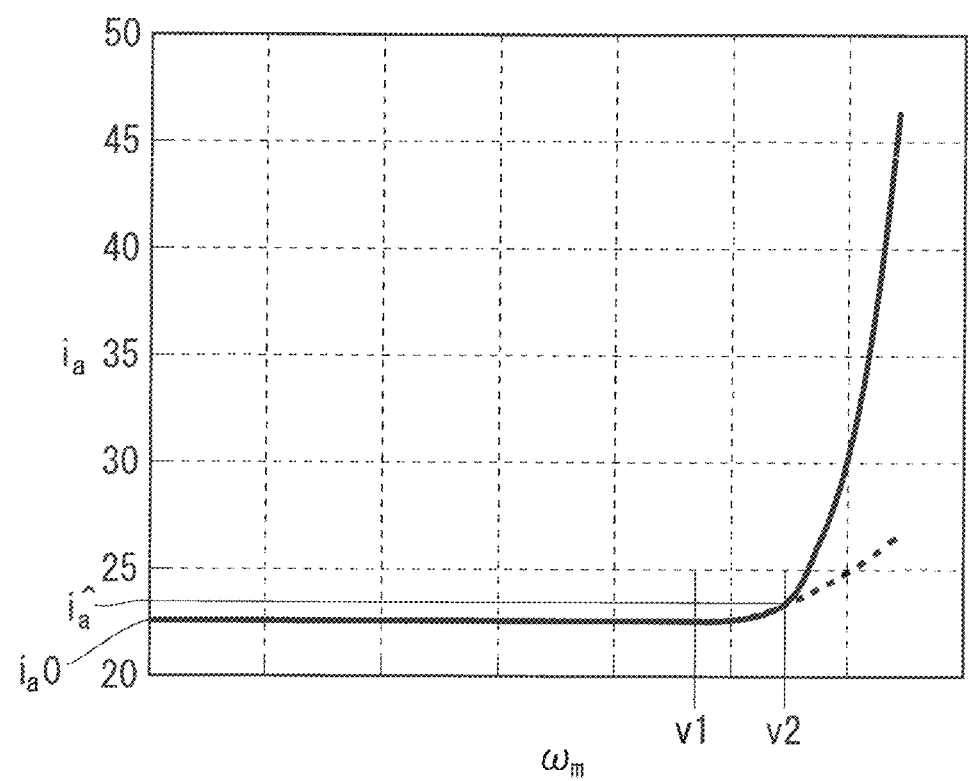

F I G. 11
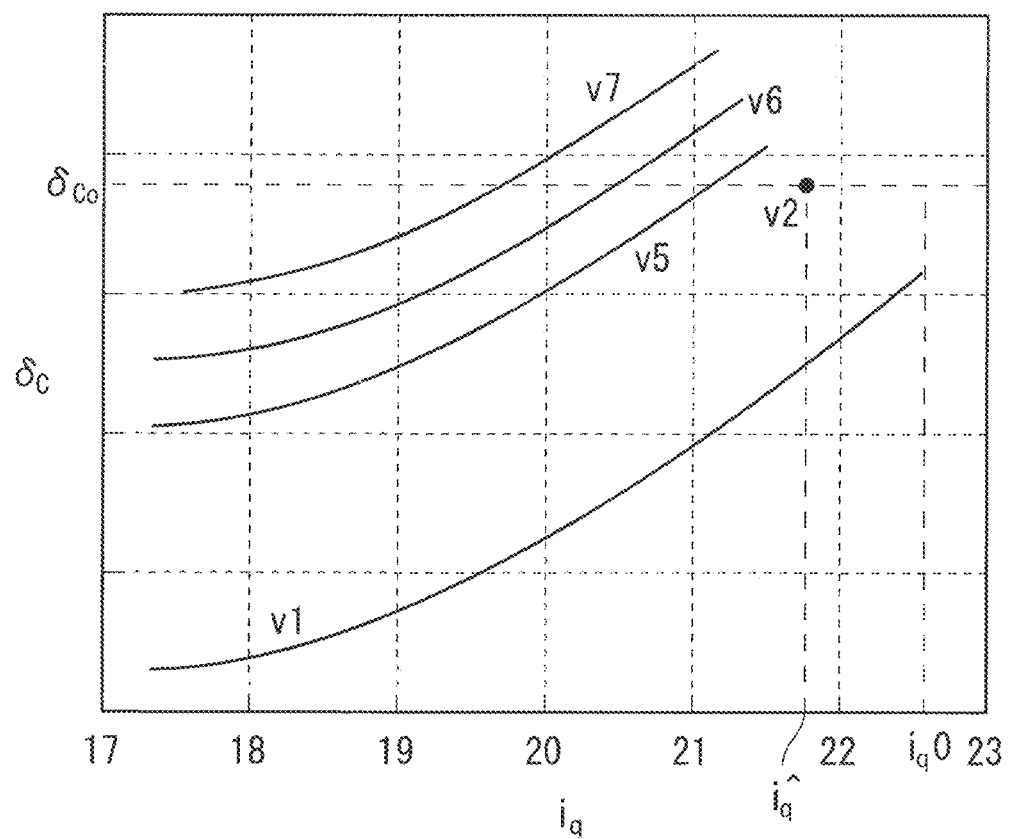

F I G. 1 4
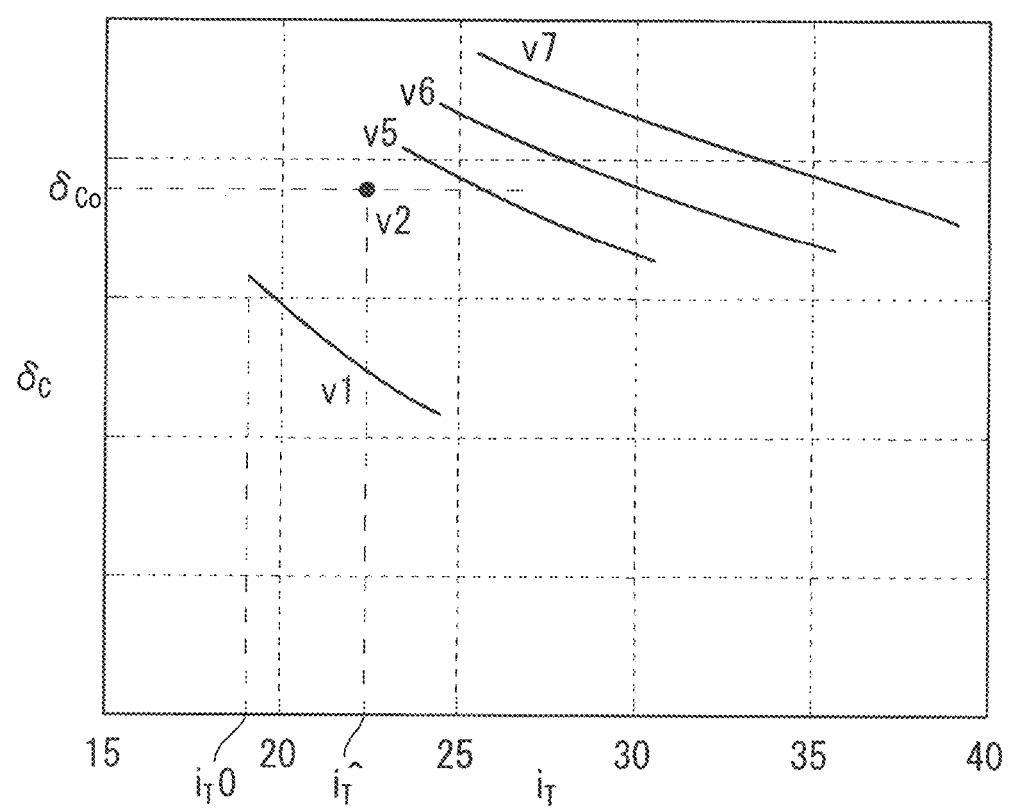

F I G. 15
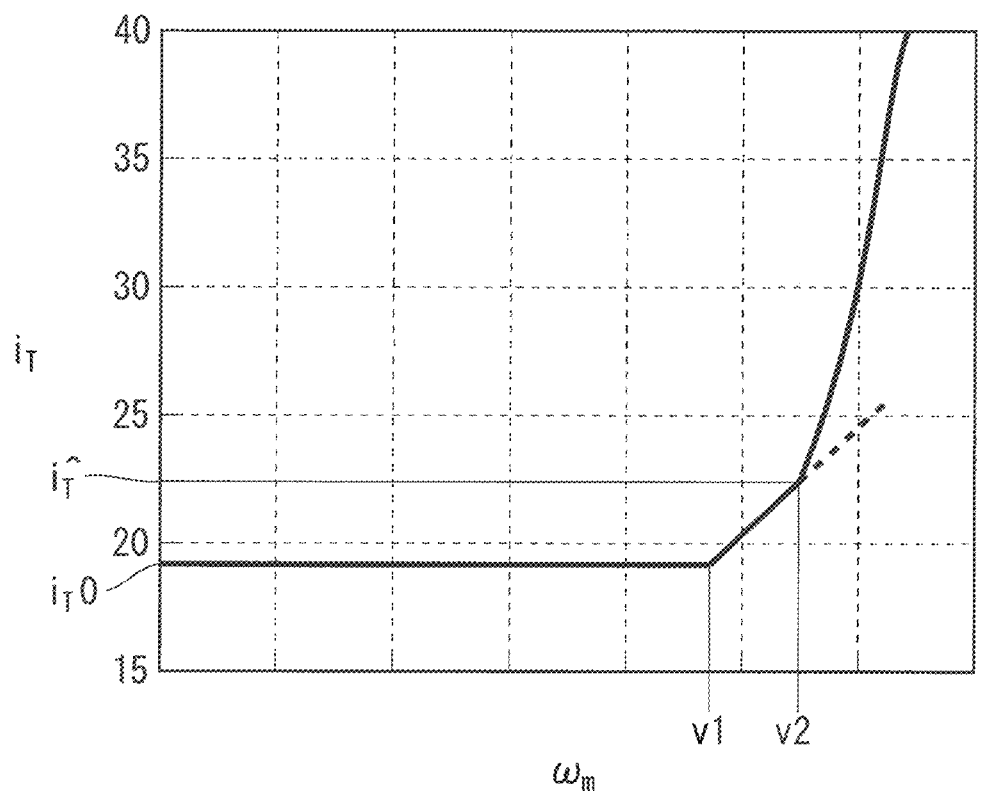

F I G. 1 8
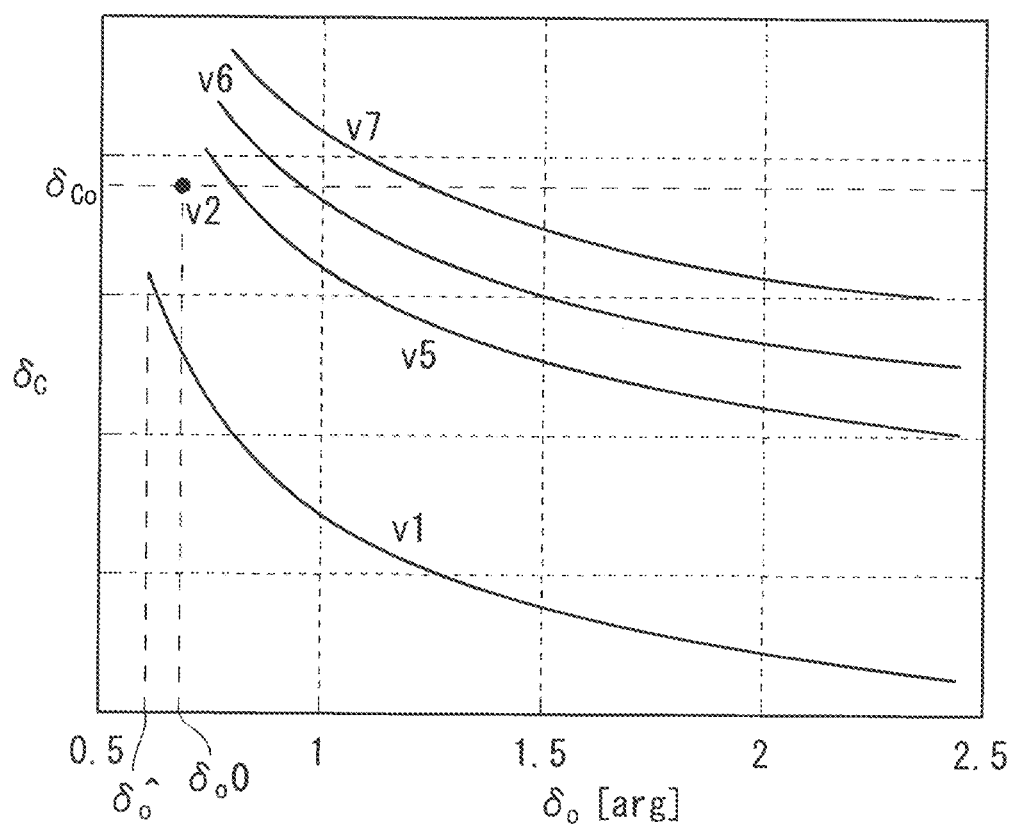

F I G. 1 9
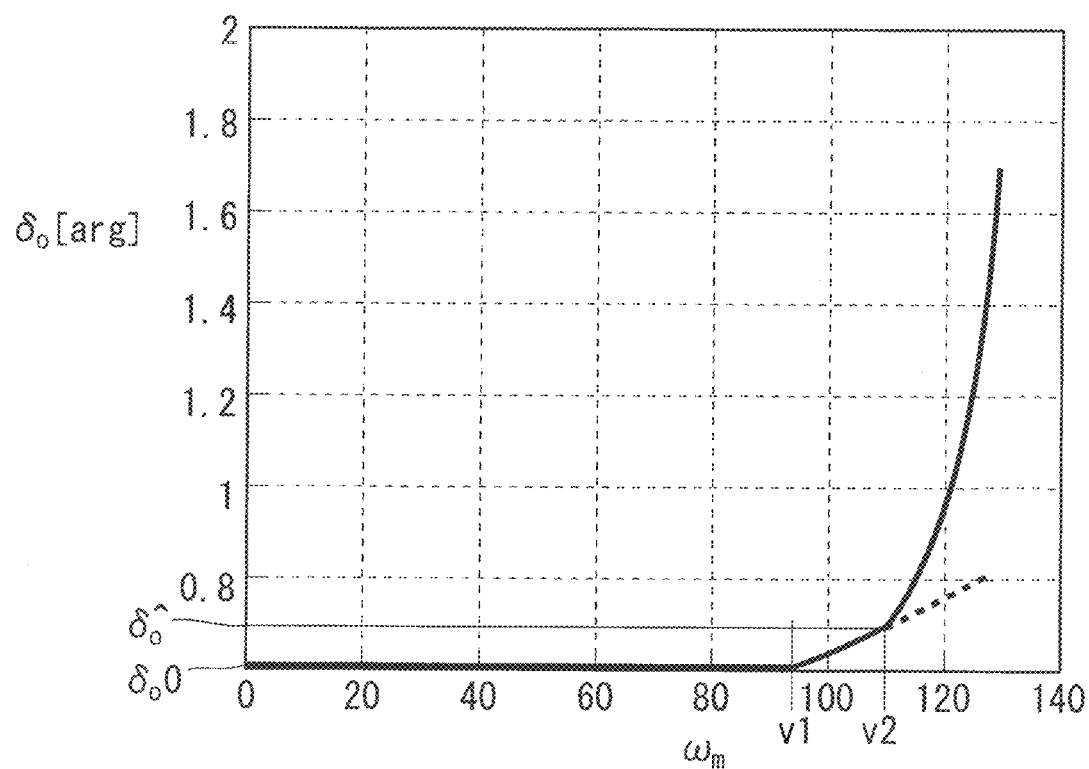

F I G. 20
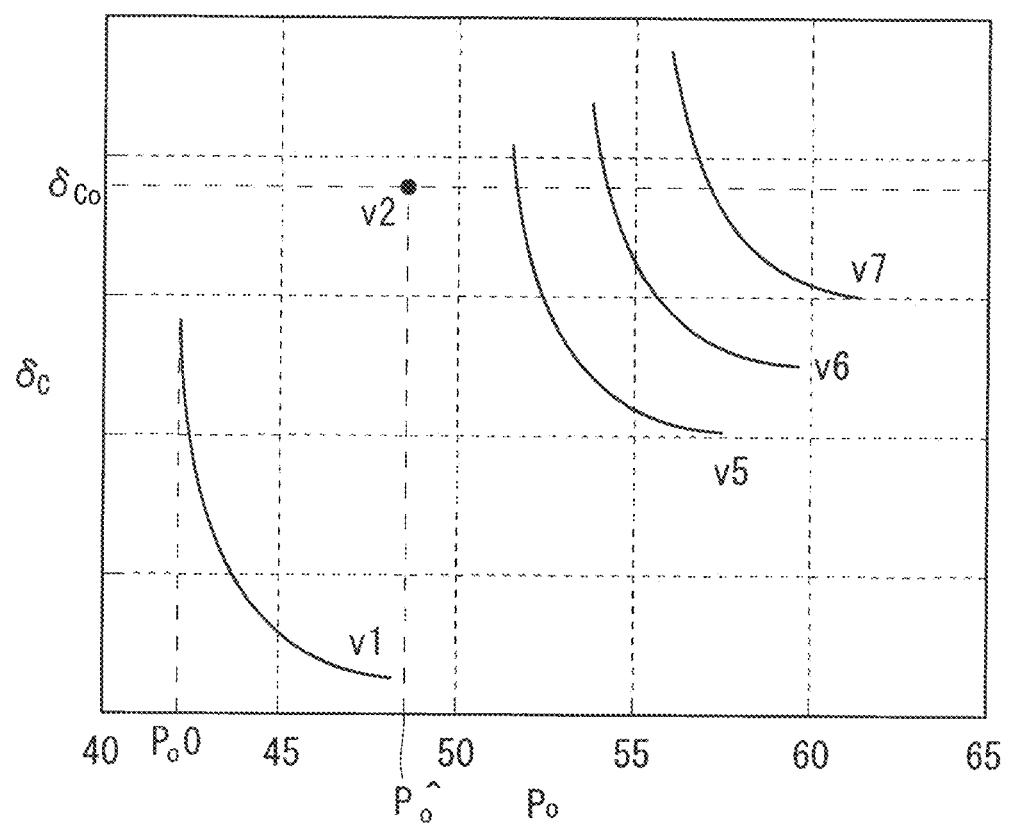

INVERTER CONTROL METHOD AND MOTOR CONTROL DEVICE

TECHNICAL FIELD

The present disclosure relates to a technique for controlling an inverter and a technique for controlling a motor.

BACKGROUND ART

Japanese Patent Application Laid-Open No. 2015-211561 proposes a technique for reducing vibration attributed to a temporal second-order component of radial electromagnetic force of a three-phase synchronous motor. The "temporal second-order component of radial electromagnetic force" is explained as a radial electromagnetic force that is two times as much as the fundamental frequency of current flowing in the motor. It is also explained that, by vibration attributed to a temporal second-order component of radial electromagnetic force, deformation into an elliptical form or a deformation mode into a square form occurs in the three-phase synchronous motor. In this technique, for a motor in which d-axis inductance and q-axis inductance differ, a q-axis current is increased, and also, a negative d-axis current is increased.

SUMMARY OF INVENTION

Problem to be Solved by the Invention

Japanese Patent Application Laid-Open No. 2015-211561 focuses on the temporal second-order component of radial electromagnetic force. Thus, there is no explicit mention of a so-called "uneven contact", which is an event in which a radial stress given from a motor shaft to a bearing that rotatably supports the motor shaft becomes strong at a specific rotation angle. The uneven contact is a factor for damaging the bearing. The present disclosure provides a technique for reducing the radial stress generated by the shaft when the motor rotates.

Means to Solve the Problem

An inverter control method of this disclosure is a method for controlling an inverter (210b) that outputs an application voltage (Vs), which is a voltage to be applied to a motor (1) that drives a load (20) by using rotation of a shaft (10).

According to a first aspect of the inverter control method, the inverter (210b) is caused to output the application voltage (Vs) having an amplitude smaller than a first maximum ($V_{max\_}\omega_{MAX}$) and the motor is caused to rotate at a first speed ($\omega_{MAX}$) and drive the load which is predetermined. The inverter (210b) is caused to output the application voltage (Vs) having an amplitude of a second maximum ($V_{max\_}\omega3$) and the motor is caused to rotate at a second speed ($\omega3$) and drive the predetermined load. The second speed ($\omega3$) is lower than the first speed ($\omega_{MAX}$).

The first maximum ($V_{max\_}\omega_{MAX}$) is a possible maximum value of an amplitude (|Vs|) of the application voltage when the motor drives the predetermined load at the first speed ($\omega_{MAX}$). The first speed ($\omega_{MAX}$) is a maximum of a speed ($\omega_m$) of rotation of the motor when the motor drives the predetermined load.

The second maximum ($V_{max\_}\omega_{MAX}$) is a possible maximum value of the amplitude (|Vs|) of the application voltage when the motor drives the predetermined load at the second speed ($\omega3$).

According to a second aspect of the inverter control method, in a case in which a speed ($\omega_m$) of rotation of the motor when the motor outputs a predetermined torque is higher than or equal to a base speed ($\omega b$) of the motor when the motor outputs the predetermined torque, the inverter (210b) is caused to output the application voltage (Vs) having an amplitude obtained by multiplying a first maximum ($V_{max\_}\omega1$) by a first ratio, the motor is caused to rotate at a first speed ($\omega1$), and the motor is caused to output the predetermined torque. The inverter (210b) is caused to output the application voltage (Vs) having an amplitude obtained by multiplying a second maximum ($V_{max\_}\omega2$) by a second ratio, the motor is caused to rotate at a second speed ($\omega2$), and the motor is caused to output the predetermined torque.

The first maximum ($V_{max\_}\omega1$) is a possible maximum value of an amplitude (|Vs|) of the application voltage when the motor outputs the predetermined torque at the first speed ($\omega1$). The second maximum ($V_{max\_}\omega2$) is a possible maximum value of the amplitude (|Vs|) of the application voltage when the motor outputs the predetermined torque at the second speed ($\omega2$).

The second speed ($\omega2$) is higher than the first speed ($\omega1$), and the second ratio is smaller than the first ratio.

According to a third aspect of the inverter control method of this disclosure, in the second aspect thereof, in which the second speed is a possible maximum ($\omega_{max}$) of the speed ($\omega_m$) when the motor outputs the predetermined torque.

A motor control device of this disclosure includes: an inverter (210b) that outputs an application voltage (Vs), which is a voltage to be applied to a motor (1) that drives a load (20) by using rotation of a shaft (10); and a controller (209) that controls operation of the inverter.

According to a first aspect of the motor control device, the controller causes the inverter (210b) to output the application voltage (Vs) having an amplitude smaller than a first maximum ($V_{max\_}\omega_{MAX}$) and causes the motor to rotate at a first speed ($\omega_{MAX}$) and drive the load which is predetermined, the controller causes the inverter (210b) to output the application voltage (Vs) having an amplitude of a second maximum ($V_{max\_}\omega3$) and causes the motor to rotate at a second speed ($\omega3$) and drive the predetermined load. The second speed ($\omega3$) is lower than the first speed ($\omega_{MAX}$).

The first maximum ($V_{max\_}\omega_{MAX}$) is a possible maximum value of an amplitude (|Vs|) of the application voltage when the motor drives the predetermined load at the first speed ($\omega_{MAX}$), and the first speed ($\omega_{MAX}$) is a maximum of a speed ($\omega_m$) of rotation of the motor when the motor drives the predetermined load.

The second maximum ($V_{max\_}\omega3$) is a possible maximum value of the amplitude (|Vs|) of the application voltage when the motor drives the predetermined load at the second speed ($\omega3$).

According to a second aspect of the motor control device, in a case in which a speed ($\omega_m$) of rotation of the motor when the motor outputs a predetermined torque is higher than or equal to a base speed ($\omega b$) of the motor when the motor outputs the predetermined torque, the controller causes the inverter (210b) to output the application voltage (Vs) having an amplitude obtained by multiplying a first maximum ($V_{max\_}\omega1$) by a first ratio, causes the motor to rotate at a first speed ($\omega1$), and causes the motor to output the predetermined torque, and causes the inverter (210b) to output the application voltage (Vs) having an amplitude obtained by multiplying a second maximum ($V_{max\_}\omega2$) by a second ratio, causes the motor to rotate at a second speed ($\omega2$), and causes the motor to output the predetermined torque.

The first maximum ($V_{max\_}\omega 1$) is a possible maximum value of an amplitude (|Vs|) of the application voltage when the motor outputs the predetermined torque at the first speed ($\omega 1$), and the second maximum ($V_{max\_}\omega 2$) is a possible maximum value of the amplitude (|Vs|) of the application voltage when the motor outputs the predetermined torque at the second speed ($\omega 2$).

The second speed ($\omega 2$) is higher than the first speed ($\omega 1$), and the second ratio is smaller than the first ratio.

According to a third aspect of the motor control device of this disclosure, in the second aspect thereof, the second speed is a possible maximum ($\omega_{max}$) of the speed ($\omega_m$) when the motor outputs the predetermined torque.

The inverter control method and the motor control device according to the present disclosure reduces the radial stress given from the shaft to the bearing when the motor rotates.

BRIEF DESCRIPTION OF DRAWINGS

FIG. 7 is a graph illustrating a relationship between the rotation speed and the current amplitude when a torque is a predetermined value;

FIG. 11 is a graph illustrating a relationship between a q-axis current and the axial deviation $\delta_C$ in which the rotation speed is a parameter;

FIG. 14 is a graph illustrating a relationship between a T-axis current and the axial deviation in which the rotation speed is a parameter;

FIG. 15 is a graph illustrating a relationship between the rotation speed and the T-axis current when the torque is a predetermined value;

FIG. 18 is a graph illustrating a relationship between a load angle and the axial deviation in which the rotation speed is a parameter;

FIG. 19 is a graph illustrating a relationship between the rotation speed and the load angle when the torque is a predetermined value;

FIG. 20 is a graph illustrating a relationship between an instantaneous real power and the axial deviation in which the rotation speed is a parameter;

DESCRIPTION OF EMBODIMENTS

Figure 1:
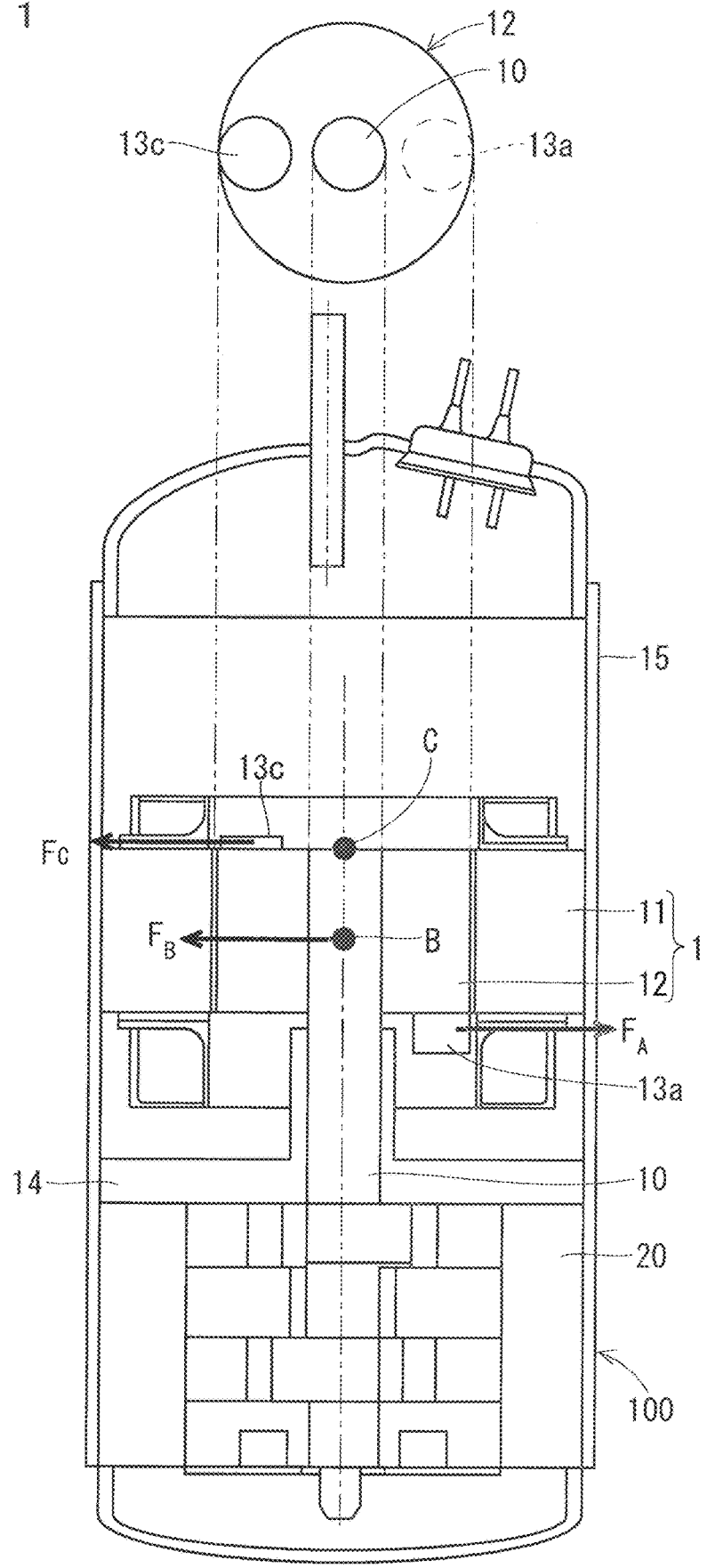
FIG. 1 is a sectional view illustrating an example of a structure of a compressor.

FIG. 1 is a sectional view illustrating an example of a structure of a compressor 100 employed for a refrigeration circuit, such as a heat pump. The compressor 100 includes a compression mechanism 20, a motor 1, a bearing 14, and a casing 15. The compression mechanism 20 compresses refrigerant (omitted from illustration). For example, a swing type is employed for the compression mechanism 20, and refrigerant is compressed by rotation transferred from the motor 1 via a shaft 10. The compression mechanism 20 is a load driven by the motor 1.

The motor 1 includes a stator 11 and a rotor 12. For example, the stator 11 and the rotor 12 are an armature and a field element, respectively. For example, the motor 1 is an inner-rotor type interior magnet synchronous motor, and the rotor 12 has a permanent magnet (omitted from illustration) that generates a field magnetic flux.

The shaft 10 is attached to the rotor 12, and is rotatably attached to the casing 15 by the bearing 14.

A balance weight 13a is provided on the compression mechanism 20 side of the rotor 12 in the direction of the shaft 10 (hereinafter "axial direction"). A balance weight 13c is provided on the opposite side to the compression mechanism 20 of the rotor 12 in the axial direction. For convenience of description of the structure, above the sectional view in FIG. 1, a top view of the rotor 12 (view of the rotor 12 seen from the opposite side to the compression mechanism 20 in the axial direction) is illustrated by being combined with the section of the rotor 12 by four imaginary lines, which are chain lines.

Rotation of the rotor 12 (hereinafter also referred to as rotation of the motor 1) causes centrifugal forces $F_A$ and $F_C$ to act on the balance weights 13a and 13c, respectively. Unbalanced magnetic pull $F_B$ acts on the shaft 10. The unbalanced magnetic pull $F_B$ is a component in a radial direction. i.e., a component in the direction orthogonal to the axial direction, attributed to an imbalance in magnetic pull between the stator 11 and the rotor 12. Only this component is focused herein because a deflection amount (hereinafter referred to as "axial deviation") generated by the centrifugal forces $F_A$ and $F_C$ acting in the radial direction and also a stress applied in the radial direction on the shaft 10 is studied. For convenience, the unbalanced magnetic pull $F_B$ is illustrated as acting at a position B of the shaft 10 in the center of the rotor 12 in the axial direction.

As the speed of rotation (hereinafter also referred to as "rotation speed") of the motor 1 is higher, the centrifugal forces $F_A$ and $F_C$ are larger. As the rotation speed is higher, the axial deviation is larger. The axial deviation is a factor of a so-called uneven contact, which is an event in which a radial stress given from the shaft 10 to the bearing 14 becomes strong at a specific rotation angle.

In order to enhance the performance of the refrigeration circuit, the rotation speed is desirably high. In other words, a small axial deviation is advantageous in enhancing the performance of the refrigeration circuit.

Figure 2:
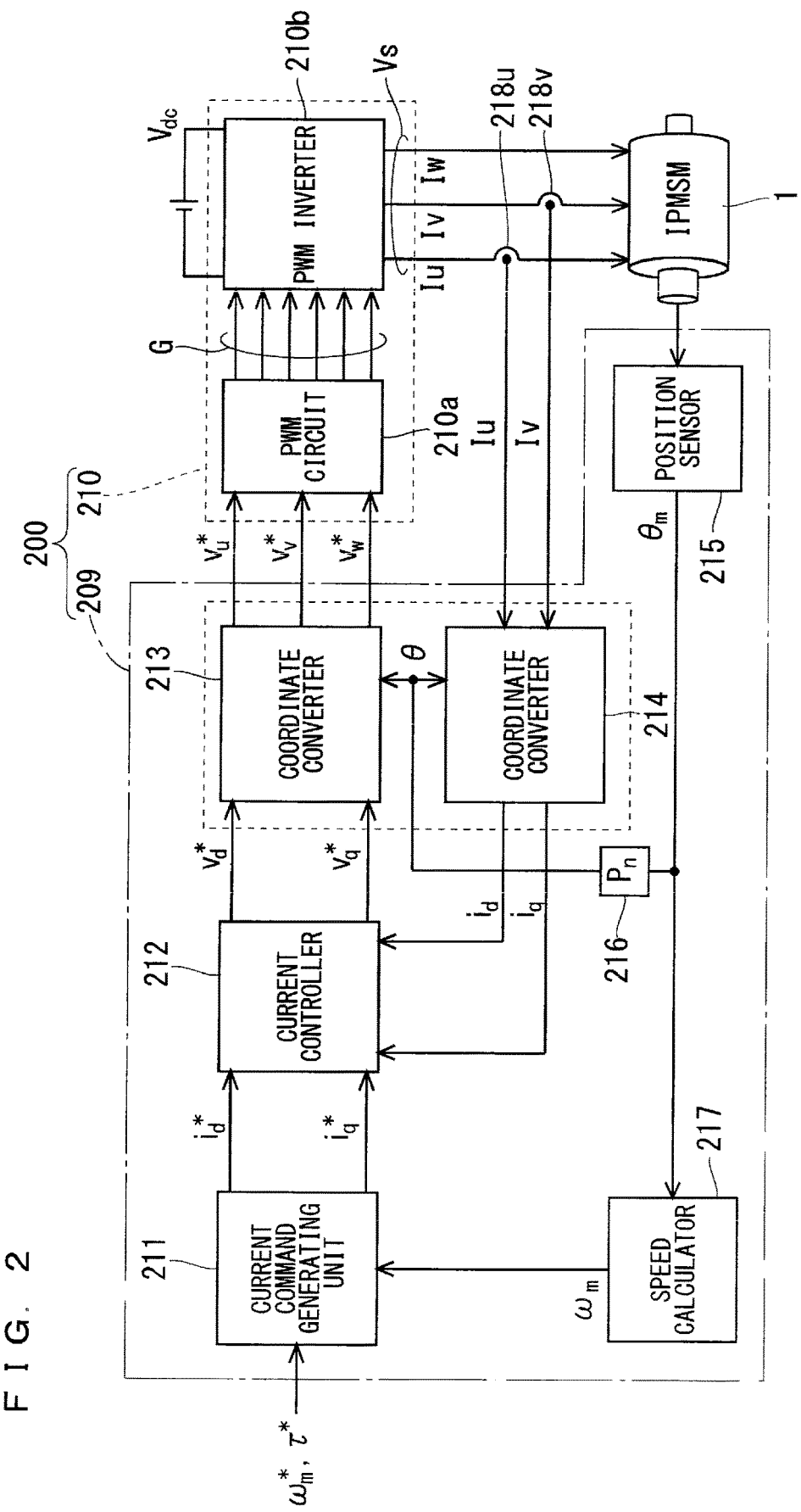
FIG. 2 is a block diagram illustrating a motor and a configuration of a motor control apparatus that drives the motor.

In the following embodiment, a motor driving technique for reducing the axial deviation is introduced. FIG. 2 is a block diagram illustrating the motor 1 and a configuration of a motor control device 200 that drives the motor 1. Herein, an example of a case in which the motor 1 is a three-phase interior magnet synchronous motor (denoted as IPMSM in the figure) is illustrated. The motor control device 200 converts three-phase alternating currents Iu, Iv, and Iw flowing in the motor 1 into a d-axis component (hereinafter "d-axis current") $i_d$, a q-axis component (hereinafter "q-axis current") $i_q$ and performs vector control. The "d-axis" and "q-axis" herein respectively indicate coordinate axe that is in the same phase as the field magnetic flux of the motor 1 and coordinate axe that advances 90 degrees with respect to the field magnetic flux. The d-axis current $i_d$ contributes to the field magnetic flux, and the q-axis current $i_q$ contributes to a torque output from the motor 1.

The motor control device 200 includes an output circuit 210 and a controller 209 that controls operation of the output circuit 210. The output circuit 210 outputs, to the motor 1, an application voltage Vs to be applied to the motor 1. The motor 1 is, for example, driven with the rotation speed controlled by the application voltage Vs. For example, the output circuit 210 performs DC/AC conversion on a DC voltage Vdc and outputs the three-phase application voltage Vs to the motor 1. The output circuit 210 supplies the three-phase alternating currents Iu, Iv, and Iw to the motor 1.

The output circuit 210 includes a pulse-width modulation circuit (displayed as "PWM circuit" in the figure) 210a and a voltage control type PWM inverter 210b. The pulse-width modulation circuit 210a receives three-phase voltage command values $v_u^*$, $v_v^*$, and $v_w^*$ and generates agate signal G for controlling operation of the PWM inverter 210b. Note that an inverter of other modulation type may also be employed instead of the PWM inverter 210b.

The DC voltage Vdc is supplied to the PWM inverter 210b from a DC power source. The PWM inverter 210b performs operation controlled by the gate signal G, converts the DC voltage Vdc into the application voltage Vs, and applies it to the motor 1. The three-phase alternating currents Iu, Iv, and Iw are supplied from the PWM inverter 210b to the motor 1. The voltage command values $v_u^*$, $v_v^*$, and $v_w^*$ are command values of the application voltage Vs.

Although the power source that supplies the DC voltage Vdc is provided outside the motor control device 200 in FIG. 2, the power source may alternatively be included in the motor control device 200. The power source can be realized, for example, using an AC/DC converter.

The controller 209 includes, for example, a current command generating unit 211, a current controller 212, coordinate converters 213 and 214, a position sensor 215, a multiplier 216, and a speed calculator 217.

Current sensors 218u and 218v sense the alternating currents Iu and Iv, respectively. The controller 20) may alternatively include the current sensors 218u and 218v. The position sensor 215 senses the rotation position of the motor 1 as a rotation angle $\theta_m$ which is a mechanical angle of the motor 1. The multiplier 216 multiplies the rotation angle $\theta_m$ by a number of pole pairs $P_n$ to obtain a rotation angle $\theta$ as an electric angle. The coordinate converter 214 receives the values of the alternating currents Iu and Iv and the rotation angle $\theta$ and obtains the d-axis current $i_d$ and the q-axis current $i_q$.

The speed calculator 217 obtains, from the rotation angle $\theta_m$, a rotation speed ωm based on a mechanical angle. The current command generating unit 211 receives a torque command τ* or receives the rotation speed $\omega_m$ and its command value $\omega_m^*$, and obtains, from these, a command value $i_d^*$ of the d-axis current $i_d$ and a command value $i_q^*$ of the q-axis current $i_q$. The torque command τ* is a command value of a torque T output from the motor 1.

From the d-axis current $i_d$ and its command value $i_d^*$ and the q-axis current $i_q$ and its command value $i_q^*$, the current controller 212 obtains a command value $v_d^*$ of a d-axis voltage $v_d$ and a command value $v_q^*$ of a q-axis voltage $v_q$. For example, the command values $v_d^*$ and $v_q^*$ can be obtained by feedback control for making the deviation between the d-axis current $i_d$ and its command value $i_d^*$ and the deviation between the q-axis current $i_q$ and its command value $i_q^*$ close to zero.

From the command value $v_d^*$ of the d-axis voltage $v_d$, the command value $v_q^*$ of the q-axis voltage $v_q$, and the rotation angle θ, the coordinate converter 213 generates the three-phase voltage command values $v_u^*$, $v_v^*$, and $v_w^*$.

In this embodiment, the position sensor 215 is not necessarily provided. It is also possible to employ a so-called sensorless type in which the rotation angle $\theta_m$ is obtained from the alternating currents Iu and Iv and the application voltage Vs.

Figure 3:
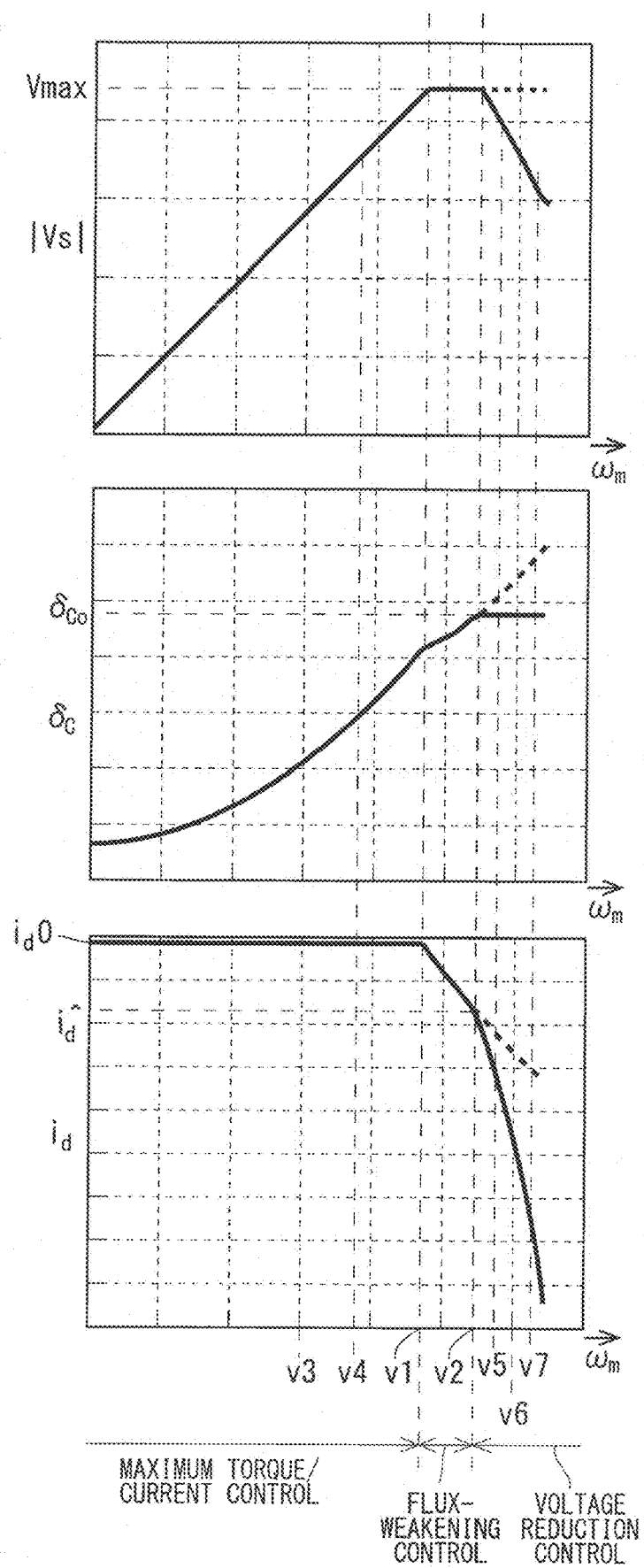
FIG. 3 shows graphs illustrating relationships between control employed in an embodiment and a rotation speed as solid lines.

FIG. 3 shows graphs illustrating relationships between control employed in this embodiment and the rotation speed $\omega_m$ as solid lines. Each of the upper graph, the middle graph, and the lower graph in FIG. 3 employs the rotation speed $\omega_m$ on the horizontal axis, and the torque command τ* is fixed to a certain value.

In FIG. 3, the upper graph employs an amplitude |Vs| of the application voltage Vs on the vertical axis, the middle graph employs an axial deviation $\delta_C$ on the vertical axis, and the lower graph employs the d-axis current $i_d$ on the vertical axis. Herein, the axial deviation $\delta_C$ is an axial deviation at a position C (FIG. 1) on the end of the shaft 10 on the balance weight 13c side in the axial direction.

When the rotation speed $\omega_m$ is lower than or equal to a rotation speed v1 (also simply referred to as "speed v1": the same applies to other rotation speeds), as the rotation speed $\omega_m$ is higher, the amplitude |Vs| is larger. For example, as such control, maximum torque/current control or maximum efficiency control can be employed. FIG. 3 illustrates an example of a case in which the maximum torque/current control is performed when the rotation speed $\omega_m$ is lower than or equal to the speed v1. In addition, the amplitude |Vs| when the rotation speed $\omega_m$ is at the speed v1 is illustrated as a voltage value Vmax.

When the rotation speed $\omega_m$ is higher than a speed v2, the amplitude |Vs| is less than the voltage value Vmax. The speed v2 is higher than or equal to the speed v1. Such control is provisionally called "voltage reduction control" for convenience in this embodiment. As its example, the upper graph in FIG. 3 illustrates a case in which v2>v1 and the amplitude |Vs| is smaller as the rotation speed (Om is higher.

When the rotation speed $\omega_m$ is higher than the speed v1 and lower than or equal to the speed v2, the amplitude |Vs| is equal to the amplitude |Vs| (=Vmax) at the speed v1 regardless of the rotation speed $\omega_m$. At this time, so-called flux-weakening control is performed on the motor 1. When v1=v2, a phenomenon in which the rotation speed $\omega_m$ is higher than the speed v1 and lower than or equal to the speed v2 does not occur, and the flux-weakening control is not performed.

For dependency of the application voltage Vs on the rotation speed $\omega_m$, the controller 209 causes the output circuit 210 to output the application voltage Vs. Specifically, the controller 209 generates the voltage command values $v_u^*$, $v_v^*$, and $v_w^*$ by which the output circuit 210 outputs the application voltage Vs in accordance with the rotation speed $\omega_m$, and outputs the voltage command values to the output circuit 210.

Figure 4:
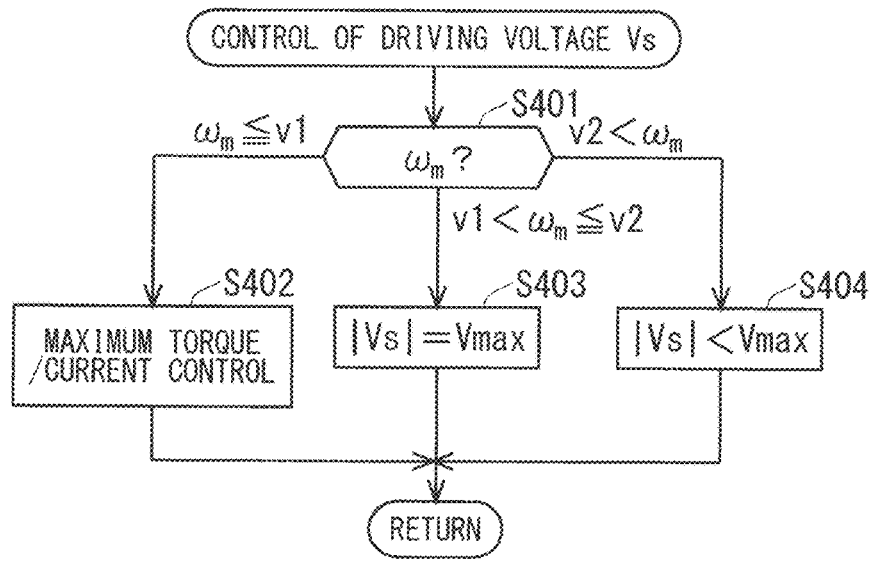
FIG. 4 is a flowchart illustrating control of an output circuit by a controller.

FIG. 4 is a flowchart illustrating control of the output circuit 210 by the controller 209. This flowchart is a routine for controlling the application voltage Vs. This routine is, for example, interrupt processing for a main routine that is not illustrated, which starts by interrupt processing and returns to the main routine upon ending of the routine. The routine is, for example, performed together with the main routine by the controller 209.

In step S401, the rotation speed $\omega_m$ is compared with the speed v1 and the speed v2. If it is determined in step S401 that $\omega_m \leq v1$, the process proceeds to step S402. If it is determined in step S401 that $v1<\omega_m \leq v2$, the process proceeds to step S403. If it is determined in step S401 that $v2<\omega_m$, the process proceeds to step S404.

In step S402, the maximum torque/current control is performed. Alternatively, instead of the maximum torque/current control, in step S402, the maximum efficiency control may be performed. Alternatively, in step S402, the maximum torque/current control and the maximum efficiency control may be performed by being switched therebetween.

In step S403, the voltage value Vmax is employed as the amplitude |Vs|, and, for example, the flux-weakening control is performed. In step S404, the voltage reduction control is performed, and a value less than the voltage value Vmax is employed as the amplitude |Vs|.

In FIG. 3, for comparison with this embodiment, the broken line represents a case in which the flux-weakening control is maintained without employing the "voltage reduction control" even if the rotation speed $\omega_m$ is higher than the speed v2. In any case in which any of the maximum torque/current control, the maximum efficiency control, and the flux-weakening control is employed, as the rotation speed $\omega_m$ is higher, the axial deviation $\delta_C$ is larger.

FIG. 3 illustrates an upper limit value $\delta_{Co}$ of the axial deviation δc. The speed v2 at which the axial deviation $\delta_C$ becomes the upper limit value $\delta_{Co}$ by the maximum torque/current control, the maximum efficiency control, or the flux-weakening control is actually measured or calculated in advance. Herein, an example of a case is illustrated in which, even if the rotation speed $\omega_m$ is increased to exceed the speed v1 and the control is switched from the maximum torque/current control to the flux-weakening control, the axial deviation $\delta_C$ is less than the upper limit value $\delta_{Co}$ when the rotation speed $\omega_m$ is lower than the speed v2. That is, an example of a case is illustrated in which, when the rotation speed $\omega_m$ is lower than or equal to the speed v2, even if the amplitude |Vs| is maintained at the voltage value Vmax, the axial deviation $\delta_C$ is less than the upper limit value $\delta_{Co}$.

When the rotation speed $\omega_m$ exceeds the speed v2, the amplitude |Vs| becomes a value less than the voltage value Vmax. Thus, even if the rotation speed $\omega_m$ is high, the axial deviation $\delta_C$ can be suppressed to be less than or equal to the upper limit value $\delta_{Co}$.

For example, the voltage value Vmax is the maximum value of an AC voltage into which the PWM inverter 210b can convert the DC voltage Vdc. Since the maximum torque/current control is employed herein, the speed v1 at which the amplitude |Vs| becomes the voltage value Vmax corresponds with abase speed. The base speed herein is the maximum value of the rotation speed of the motor 1 at which the motor 1 can generate the torque τ by the maximum torque/current control. In a case in which the maximum efficiency control is employed, the speed v1 is higher than the base speed.

Figure 5:
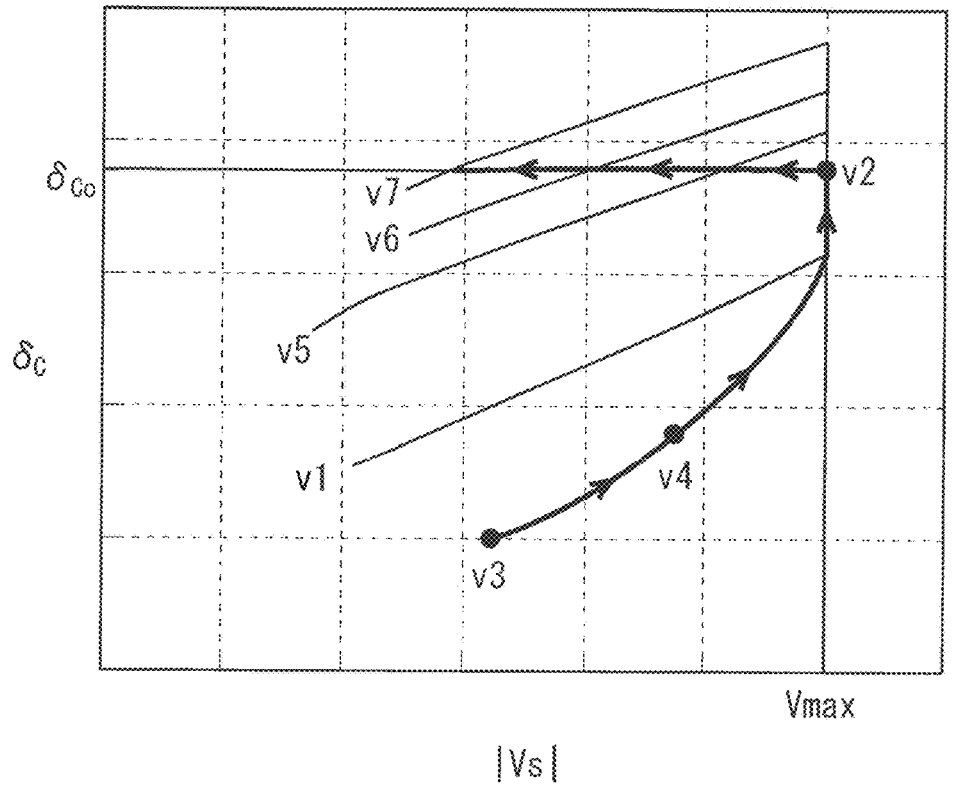
FIG. 5 is a graph illustrating a relationship between an axial deviation and an amplitude of an application voltage in which the rotation speed is a parameter.

FIG. 5 is a graph illustrating a relationship between the axial deviation $\delta_C$ and the amplitude |Vs| in which the rotation speed $\omega_m$ is a parameter. FIGS. 3 and 5 illustrate cases in which the same torque command τ* is used. Hereinafter, reasons why the axial deviation $\delta_C$ can be suppressed to be less than or equal to the upper limit value $\delta_{Co}$ by the voltage reduction control will be described with reference to FIG. 5.

FIG. 5 illustrates a relationship between the axial deviation $\delta_C$ and the amplitude |Vs| when the rotation speed $\omega_m$ becomes a speed v1, v5, v6, or v7 (where v1<v2<v5<v6<v7). When the torque τ is maintained, as the amplitude |Vs| for achieving the rotation speed $\omega_m$ is larger, the axial deviation $\delta_C$ is larger. As the rotation speed $\omega_m$ is higher, the axial deviation $\delta_C$ is larger.

In FIG. 5, when the rotation speed $\omega_m$ becomes a speed v3, v4, or v2 (where v3<v4<v1<v2), the value of the axial deviation $\delta_C$ with the amplitude |Vs| employed during the maximum torque/current control and the flux-weakening control is additionally plotted. The thick line in FIG. 5 indicates that, in the direction of arrowheads attached thereto, the amplitude |Vs| employed in this embodiment changes in accordance with increase in the rotation speed $\omega_m$.

In accordance with increase in the rotation speed $\omega_m$ to the speeds v3, v4, and v1, the amplitude |Vs| and the axial deviation $\delta_C$ increase. When the rotation speed $\omega_m$ reaches the speed v1, the amplitude |Vs| reaches the voltage value Vmax. Thus, even if the rotation speed $\omega_m$ is more increased, the amplitude |Vs| is no more increased.

Until the rotation speed $\omega_m$ reaches the speed v2, the amplitude |Vs| is maintained at the voltage value Vmax (the thick-line arrow in FIG. 5 directs upward from bottom in parallel to the vertical axis). In this case, the flux-weakening control is performed, and the axial deviation $\delta_C$ increases.

When the rotation speed $\omega_m$ reaches the speed v2, the axial deviation $\delta_C$ reaches the upper limit value $\delta_{Co}$, and when the rotation speed $\omega_m$ exceeds the speed v2, the voltage reduction control is performed. Thus, even if the rotation speed $\omega_m$ is high, the axial deviation $\delta_C$ is maintained at the upper limit value $\delta_{Co}$.

It is needless to say that the axial deviation $\delta_C$ is not necessarily maintained at the upper limit value $\delta_{Co}$ even if the amplitude |Vs| is decreased. However, if the amplitude |Vs| is decreased to be less than the voltage value Vmax, the axial deviation $\delta_C$ is more reduced than that in a case in which the amplitude |Vs| is maintained at the voltage value Vmax. As for the middle graph in FIG. 3, when the voltage reduction control is employed, the solid-line curve is always below the broken-line curve. In other words, the radial stress at a specific rotation angle when the motor 1 is rotating is reduced. This contributes to reduction of the uneven contact of the shaft 10 to the bearing 14.

As described above, the axial deviation $\delta_C$ may become less than the upper limit value $\delta_{Co}$ by decrease in the amplitude |Vs|. For example, the amplitude |Vs| in the voltage reduction control can be a fixed value that is lower than the voltage value represented by the solid line in the upper graph in FIG. 3.

In the lower graph in FIG. 3, also in the voltage reduction control as in the flux-weakening control, the d-axis current $i_d$ decreases (since the d-axis current $i_d$ is a negative value, the absolute value thereof increases). Note that the inclination of decrease in the d-axis current $i_d$ with respect to increase in the rotation speed $\omega_m$ is more obvious in the voltage reduction control than in the flux-weakening control.

Note that in the voltage reduction control, unlike in the simple flux-weakening control, the amplitude |Vs| becomes a value lower than the maximum thereof.

Hereinafter, the d-axis current $i_d$ for making the axial deviation $\delta_C$ less than or equal to the upper limit value $\delta_{Co}$ will be described by using expressions.

| Name | Symbol |
|---|---|
| d-axis permeance coefficient | $P_{d0}$, $P_{d1}$ |
| q-axis permeance coefficient | $P_{q0}$, $P_{q1}$ |
| d-axis gap permeance per unit area | $P_{gd} = P_{d0} + 2P_{d1}\cos(2P_n\theta_{rm})$ |
| q-axis gap permeance per unit area | $P_{gq} = P_{q0} + 2P_{q1}\cos(2P_n\theta_{rm})$ |
| permanent magnet magnetomotive force constant | $F_M$ |
| armature current magnetomotive force constant | $F_D$ |
| permanent magnet magnetomotive force | $f_M = F_M\cos(P_n\theta_{rm})$ |
| armature current magnetomotive force | $f_D = F_D(i_d\cos[P_n\theta_{rm}] + i_q\sin[P_n\theta_{rm}])$ |
| number of pole pairs | $P_n$ |
| arbitrary phase on rotor (based on d-axis, mechanical angle) | $\theta_{rm}$ |
| d-axis current | $i_d$ |
| q-axis current | $i_q$ |
| air permeability | $\mu_0$ |
| offset amount of shaft 10 | x |
| average gap length between stator 11 and rotor 12 | g |
| unbalanced magnetic pull | $F_B$ |
| centrifugal force acting on balance weights 13a and 13c | $F_A$, $F_C$ |
| axial deflection (axial stress) at point C | $\delta_C$ |
| axial stress predetermined value | $\delta_{Co}$ |
| constant determined by material physical property and shape of shaft | $k_A$, $k_B$, $k_C$ |
| mass of balance weights 13a and 13c | $m_A$, $m_C$ |
| center of gravity (rotation center basis) of balance weights 13a and 13c | $r_A$, $r_C$ |
| mechanical angular speed | $\omega_m$ |

The axial deviation $\delta_C$ can be expressed as Expression (1) based on an elasticity equation of beam deflection.

$$\delta_C = k_A F_A + k_B F_B + k_C F_C \quad (1)$$

As an armature winding included in the armature of the motor 1, a case in which a plurality of coils are connected in series for each phase is employed as an example. In this case, the unbalanced magnetic pull $F_B$ is expressed as Expression (2).

$$F_B = \frac{x}{g} \cdot \frac{\pi}{2\mu_0} \cdot \left\{ \begin{array}{c} (F_D i_d + F_M)^2[(P_{d0} + P_{d1})^2 + P_{d1}^2 +] \\ (F_D i_q)^2[(P_{q0} - P_{q1})^2 + P_{q1}^2] \end{array} \right\} = ai_d^2 + bi_d + c \quad (2)$$

where
$$\begin{cases} a = \frac{x}{g} \cdot \frac{\pi}{2\mu_0} \cdot (F_D^2)[(P_{d0} + P_{d1})^2 + P_{d1}^2] \\ b = \frac{x}{g} \cdot \frac{\pi}{2\mu_0} \cdot (2F_D F_M)[(P_{d0} + P_{d1})^2 + P_{d1}^2] \\ c = \frac{x}{g} \cdot \frac{\pi}{2\mu_0} \cdot \left\{ \begin{array}{c} +(F_M^2)[(P_{d0} + P_{d1})^2 + P_{d1}^2] \\ +(F_D i_q)^2[(P_{q0} - P_{q1})^2 + P_{q1}^2] \end{array} \right\} \end{cases}$$

The centrifugal forces $F_A$ and $F_C$ are expressed as Expression (3), and Expression (4) is derived from Expressions (1), (2), and (3).

$$F_A = m_A r_A \omega_m^2, \quad F_C = m_C r_C \omega_m^2 \quad (3)$$

$$\omega_m^2 = -\frac{k_B \delta_c}{k_A m_A r_A + k_C m_C r_C}(ai_d^2 + bi_d + c) \quad (4)$$

In a case in which the q-axis current $i_q$ is fixed, not only values a and b, but also a value c is fixed. Thus, from a relationship illustrated in Expression (5) obtained by setting $\delta_C = \delta_{Co}$ in Expression (4), it is found that the square of the rotation speed $\omega_m$ is in direct proportion to a quadratic expression of the d-axis current $i_d$. That is, by determining the d-axis current $i_d$ in accordance with the rotation speed $\omega_m$ according to Expression (5), the axial deviation $\delta_C$ can be less than or equal to the upper limit value $\delta_{Co}$.

$$\omega_m^2 = -\frac{k_B \delta_{co}}{k_A m_A r_A + k_C m_C r_C}(ai_d^2 + bi_d + c) \quad (5)$$

As understood from Expression (5), when the d-axis current $i_d$ is larger than the value (-b/2a), as the d-axis current $i_d$ is smaller, the axial deviation $\delta_C$ is also smaller. When the d-axis current $i_d$ is smaller than the value (-b/2a), as the d-axis current $i_d$ is smaller, the axial deviation $\delta_C$ is larger. Thus, in order to reduce the axial deviation $\delta_C$ as much as possible, the d-axis current $i_d$ is desirably the value (-b/2a).

Figure 6:
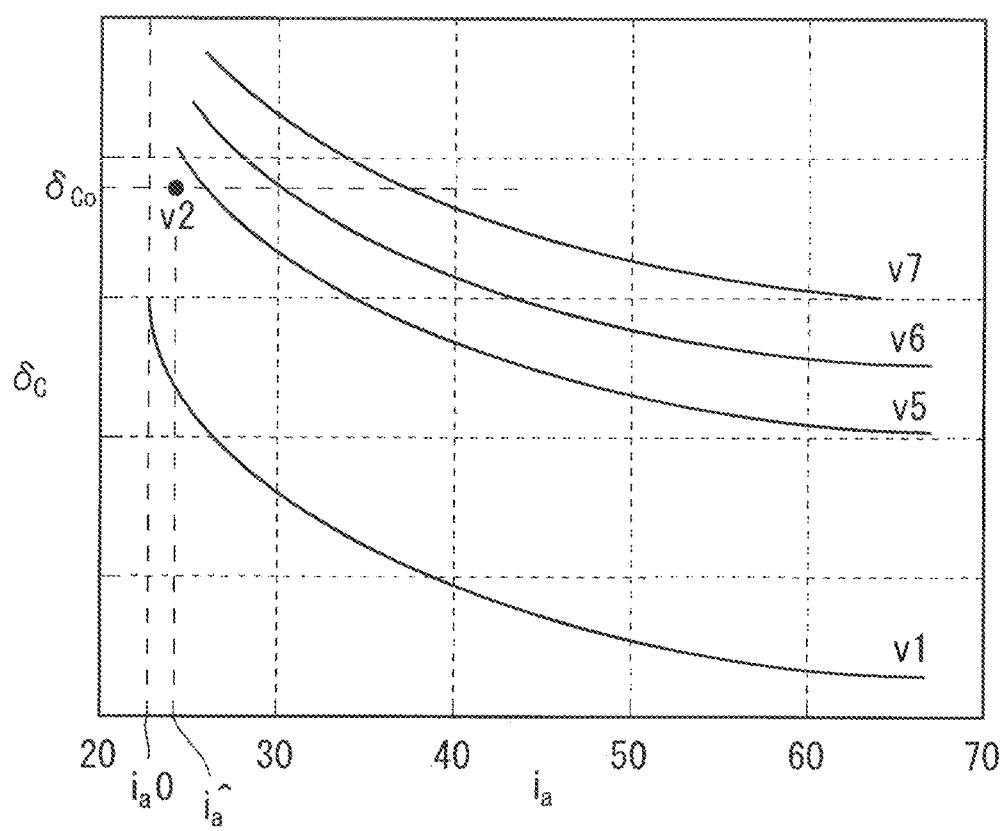
FIG. 6 is a graph illustrating a relationship between a current amplitude and the axial deviation in which the rotation speed is a parameter.

FIG. 6 is a graph illustrating a relationship between a current amplitude ia (arbitrary unit) and the axial deviation $\delta_C$ in which the rotation speed $\omega_m$ is a parameter. Note that the torque $\tau$ is fixed. Herein, ia=$[i_d^2+i_q^2]^{1/2}$ and is the amplitude of a current vector Ia when the alternating currents Iu, Iv, and Iw are expressed as the current vector Ia.

FIG. 6 illustrates a relationship between the axial deviation $\delta_C$ and the current amplitude ia when the rotation speed $\omega_m$ becomes a speed v1, v5, v6, or v7. When the torque $\tau$ is maintained, as the current amplitude ia for achieving the rotation speed $\omega$, is larger, the axial deviation $\delta_C$ is smaller. As the rotation speed $\omega_m$ is higher, the axial deviation $\delta_C$ is larger.

In FIG. 6, the value of the axial deviation $\delta_C$ (this corresponds to the upper limit value $\delta_{Co}$) with the current amplitude ia employed during the flux-weakening control when the rotation speed $\omega_m$ becomes a speed v2 is additionally plotted. In this case, the amplitude |Vs| becomes the voltage value Vmax, and the current amplitude ia becomes a value ia^ obtained as described later. When the rotation speed $\omega_m$ is lower than or equal to the speed v1 during the maximum torque/current control, the current amplitude ia becomes a value ia0.

FIG. 7 is a graph illustrating a relationship between the rotation speed win and the current amplitude ia (arbitrary unit: the same unit as in FIG. 6) when the torque τ is a predetermined value. The solid line illustrates a case in which $\omega_m$>v2 and the voltage reduction control is employed, and the broken line illustrates a case in which $\omega_m$>v2 and the flux-weakening control is employed. In the illustrated cases, the maximum torque/current control is employed when $\omega_m$≤v1 and the flux-weakening control is employed when v1<$\omega_m$≤v2.

Thus, when the rotation speed $\omega_m$ exceeds the speed v2, the current amplitude ia becomes a value larger than the value employed during the flux-weakening control (this is larger than the value ia^), so that the above-described voltage reduction control can be performed.

That is, when the rotation speed $\omega_m$ exceeds the speed v2, the controller 209 causes the output circuit 210 to output, to the motor 1, the alternating currents Iu, Iv. and Iw from which the current vector Ia with the current amplitude ia larger than the value of the current amplitude ia employed during the flux-weakening control (this is larger than the value ia^) is obtained.

The value of the current amplitude ia employed during the flux-weakening control can be obtained as follows. Expressions (6), (7), (8), and (9) are satisfied by adopting a rotation speed ω as an electric angle, the torque τ (this may be substituted by the torque command τ*), d-axis inductance $L_d$ and q-axis inductance $L_q$ of the motor 1, a field magnetic flux $\psi_a$ generated by a permanent magnet of the field element included in the motor 1, an electric resistance $R_a$ of the motor 1, the d-axis voltage $v_d$ and the q-axis voltage $v_q$ (these may be substituted by the respective command value $v_d^*$ and $v_q^*$), and a differential operator p.

$$V\max = \sqrt{v_d^2 + v_q^2} \quad (6)$$

$$\begin{pmatrix} v_d \\ v_q \end{pmatrix} \begin{pmatrix} R_a + pL_d & -\omega L_q \\ \omega L_d & R_a + pL_q \end{pmatrix} \begin{pmatrix} i_d \\ i_q \end{pmatrix} + \begin{pmatrix} 0 \\ \omega \Psi_a \end{pmatrix} \quad (7)$$

$$\tau = P_n \Psi_a i_q + P_n (L_d - L_q) i_d i_q \quad (8)$$

$$ia = \sqrt{i_d^2 + i_q^2} \quad (9)$$

The rotation speed ω is obtained by the product of the rotation speed $\omega_m$ and the number of pole pairs $P_n$. Thus, the current amplitude ia obtained from simultaneous equations of Expressions (6), (7), (8), and (9) where $\omega = P_n \cdot \omega_m$ is the value of the current amplitude ia employed during the flux-weakening control. The current amplitude ia obtained from simultaneous equations of Expressions (6), (7), (8), and (9) in which the left side of Expression (6) is $\omega = P_n \cdot v1$ is the value ia0.

Figure 8:
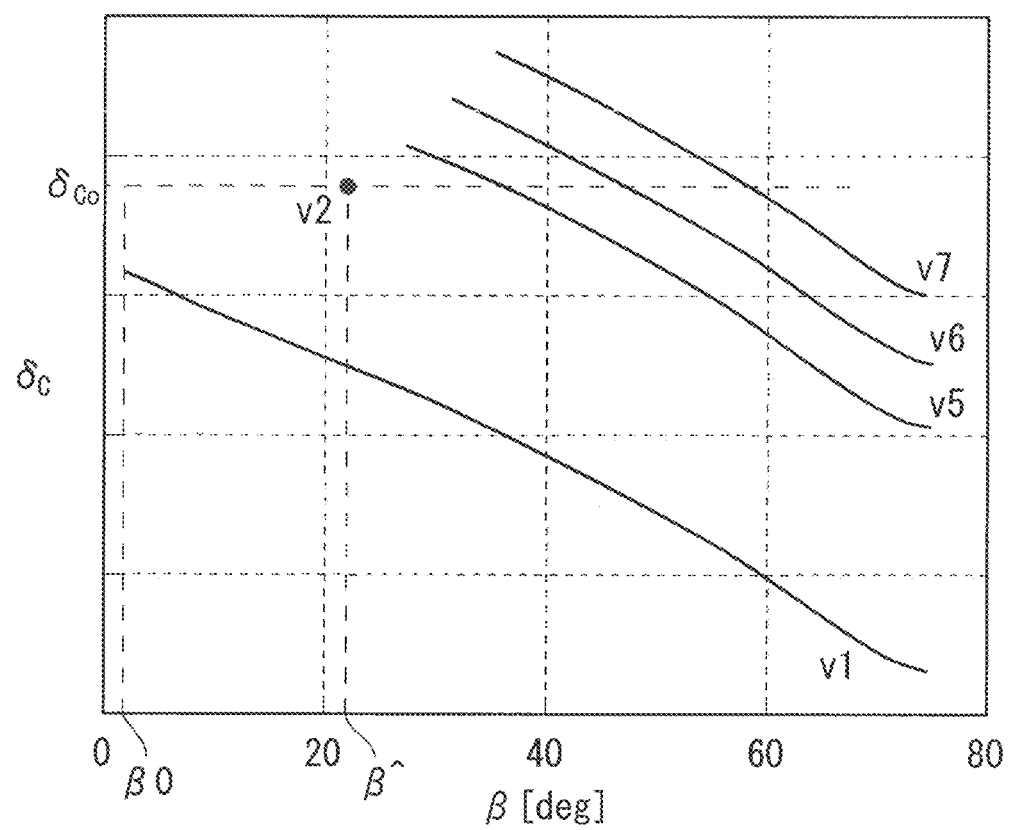
FIG. 8 is a graph illustrating a relationship between a phase of a current vector and the axial deviation in which the rotation speed is a parameter.

FIG. 8 is a graph illustrating a relationship between a phase β of the current vector Ia with respect to the q-axis and the axial deviation $\delta_C$ in which the rotation speed $\omega_m$ is a parameter. Note that the torque τ is fixed. There is a relationship of Expression (10).

$$\beta = \tan^{-1}\left(-\frac{i_d}{i_q}\right) \quad (10)$$

FIG. 8 illustrates a relationship between the axial deviation $\delta_C$ and the phase β when the rotation speed $\omega_m$ becomes a speed v1, v5, v6, or v7. When the torque τ is maintained, as the phase β for achieving the rotation speed $\omega_m$ is larger, the axial deviation $\delta_C$ is smaller. As the rotation speed $\omega_m$ is higher, the axial deviation $\delta_C$ is larger.

In FIG. 8, the value of the axial deviation $\delta_C$ (this corresponds to the upper limit value $\delta_{Co}$) with the phase β employed during the flux-weakening control when the rotation speed Om becomes a speed v2 is additionally plotted. In this case, the amplitude |Vs| becomes the voltage value Vmax, and the phase β becomes a value β^ obtained as described later. When the rotation speed $\omega_m$ is lower than or equal to the speed v1 during the maximum torque/current control, the phase β becomes a value β0.

Figure 9:
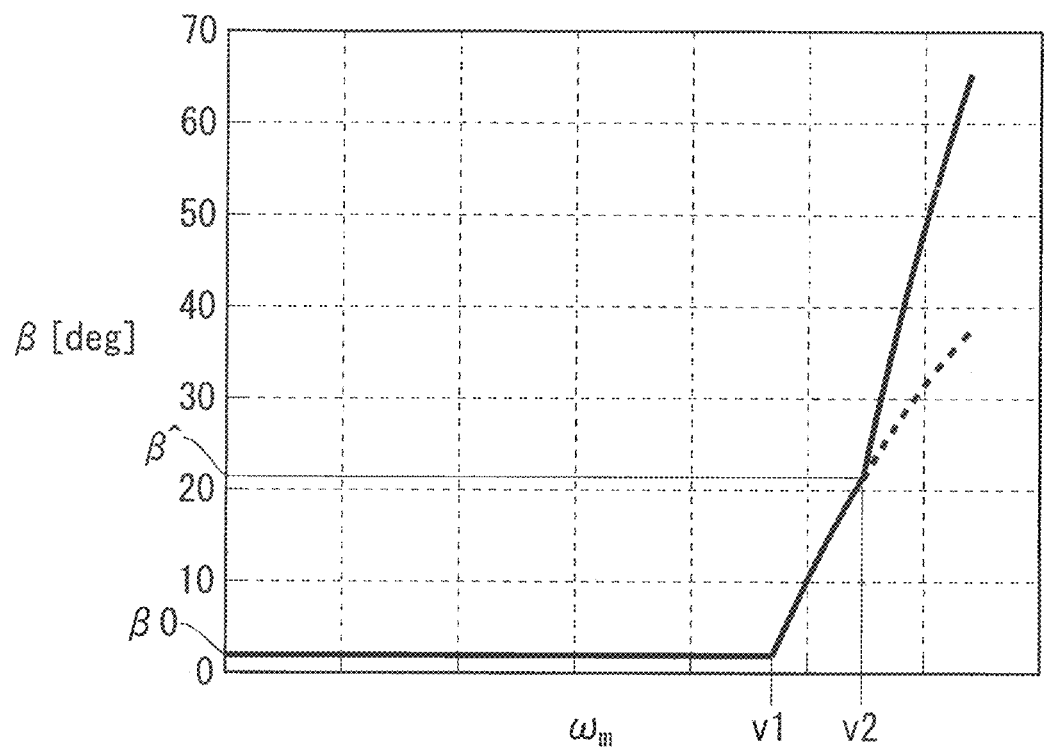
FIG. 9 is a graph illustrating a relationship between the rotation speed and the phase when the torque is a predetermined value.

FIG. 9 is a graph illustrating a relationship between the rotation speed (on and the phase β when the torque τ is a predetermined value. The solid line illustrates a case in which $\omega_m$>v2 and the voltage reduction control is employed, and the broken line illustrates a case in which $\omega_m$>v2 and the flux-weakening control is employed. In the illustrated cases, the maximum torque/current control is employed when $\omega_m$≤v1 and the flux-weakening control is employed when v1<$\omega_m$≤v2.

Thus, when the rotation speed $\omega_m$ exceeds the speed v2, the phase β becomes a value larger than the value employed during the flux-weakening control (this is larger than the value β^), so that the above-described voltage reduction control can be performed.

That is, when the rotation speed $\omega_m$ exceeds the speed v2, the controller 209 causes the output circuit 210 to output, to the motor 1, the alternating currents Iu, Iv, and Iw with which the phase β larger than the value of the phase β employed during the flux-weakening control is obtained.

The phase β obtained from simultaneous equations of Expressions (6), (7), (8), and (10) where $\omega = P_n \cdot \omega_m$ is the value of the phase β employed during the flux-weakening control. The phase β obtained from simultaneous equations of Expressions (6), (7), (8), and (10) in which the left side of Expression (6) is $\omega = P_n \cdot v1$ is the value β0.

Figure 10:
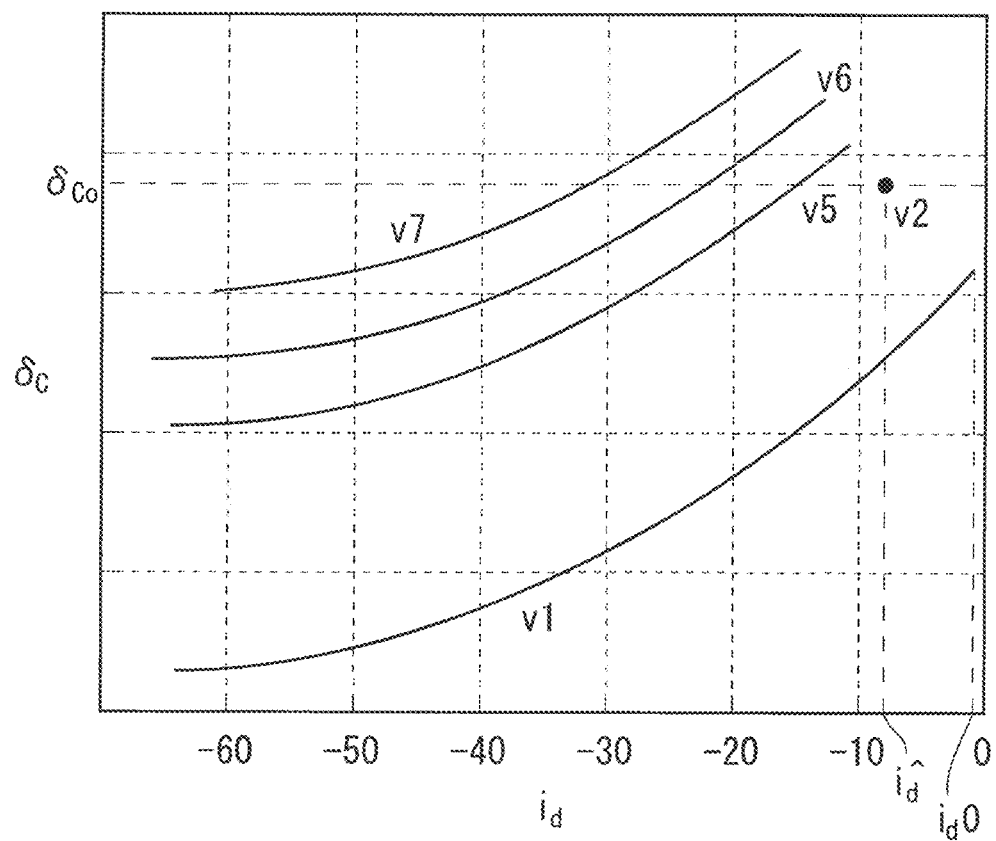
FIG. 10 is a graph illustrating a relationship between a d-axis current and the axial deviation in which the rotation speed is a parameter.

FIG. 10 is a graph illustrating a relationship between the d-axis current $i_d$ (<0; arbitrary unit) and the axial deviation $\delta_C$ in which the rotation speed $\omega_m$ is a parameter.

FIG. 10 illustrates a relationship between the axial deviation $\delta_C$ and the d-axis current $i_d$ when the rotation speed $\omega_m$ becomes a speed v1, v5, v6, or v7. Note that the torque τ is fixed. When the torque τ is maintained, as the d-axis current $i_d$ for achieving the rotation speed $\omega_m$ is larger (the absolute value is smaller), the axial deviation $\delta_C$ is larger. As the rotation speed $\omega_m$ is higher, the axial deviation $\delta_C$ is larger.

In FIG. 10, the value of the axial deviation $\delta_C$ (this corresponds to the upper limit value $\delta_{Co}$) with the d-axis current $i_d$ employed during the flux-weakening control when the rotation speed $\omega_m$ becomes a speed v2 is additionally plotted. In this case, the amplitude |Vs| becomes the voltage value Vmax, and the d-axis current $i_d$ becomes a value $i_d^{\hat{}}$ obtained as described later. When the rotation speed $\omega_m$ is lower than or equal to the speed v1 during the maximum torque/current control, the d-axis current $i_d$ becomes a value $i_d 0$ (refer to the lower graph in FIG. 3).

Thus, when the rotation speed $\omega_m$ exceeds the speed v2, the d-axis current $i_d$ becomes a value smaller (the absolute value is larger) than a value employed during the flux-weakening control (this is smaller than the value $i_d^{\hat{}}$), so that the above-described voltage reduction control can be performed.

That is, when the rotation speed $\omega_m$ exceeds the speed v2, the controller 209 causes the output circuit 210 to output, to the motor 1, the alternating currents Iu, Iv, and Iw having a d-axis component the value of which is smaller than the value of the d-axis current $i_d$ employed during the flux-weakening control.

FIG. 11 is a graph illustrating a relationship between the q-axis current $i_q$ (arbitrary unit) and the axial deviation $\delta_C$ in which the rotation speed $\omega_m$ is a parameter. Note that the torque $\tau$ is fixed.

FIG. 11 illustrates a relationship with the axial deviation $\delta_C$ when the rotation speed $\omega_m$ becomes a speed v1, v5, v6, or v7. When the torque $\tau$ is maintained, as the q-axis current $i_q$ for achieving the rotation speed $\omega_m$ is larger, the axial deviation $\delta_C$ is larger. As the rotation speed $\omega_m$ is higher, the axial deviation $\delta_C$ is larger.

In FIG. 11, the value of the axial deviation $\delta_C$ (this corresponds to the upper limit value $\delta_{Co}$) with the q-axis current $i_q$ employed during the flux-weakening control when the rotation speed $\omega_m$ becomes a speed v2 is additionally plotted. In this case, the amplitude |Vs| becomes the voltage value Vmax, and the q-axis current $i_q$ becomes a value $i_q\hat{}$ obtained as described later. When the rotation speed $\omega_m$ is lower than or equal to the speed v1 during the maximum torque/current control, the q-axis current $i_q$ becomes a value $i_q 0$.

Thus, when the rotation speed $\omega_m$ exceeds the speed v2, the q-axis current $i_q$ becomes a value smaller than the value employed during the flux-weakening control (this is smaller than the value $i_q\hat{}$), so that the above-described voltage reduction control can be performed.

Figure 12:
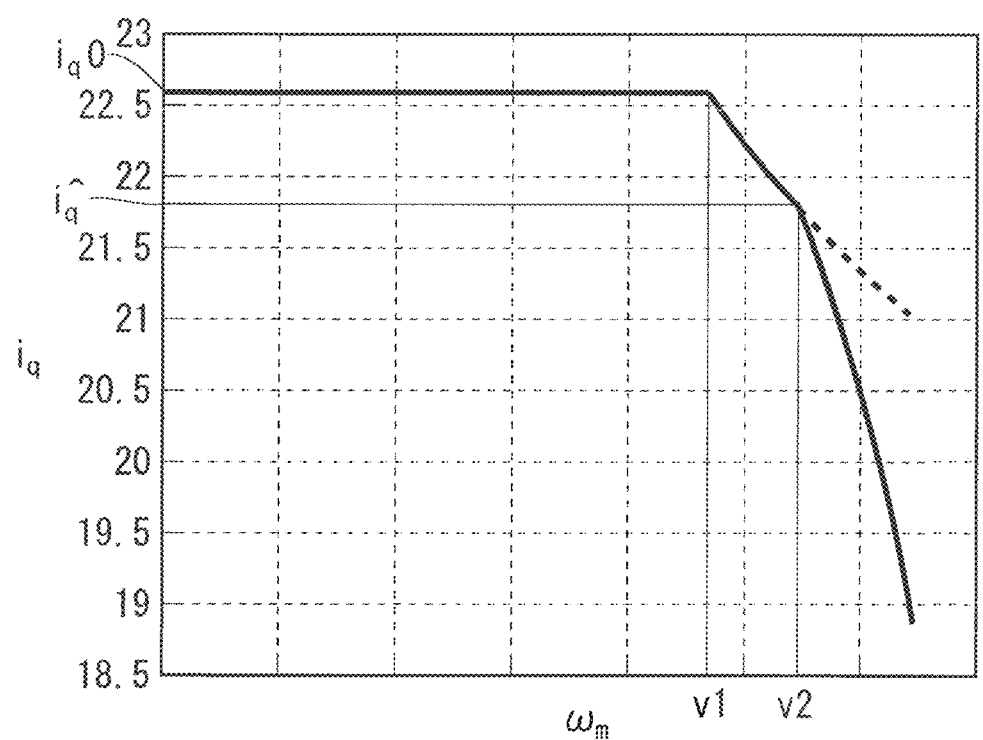
FIG. 12 is a graph illustrating a relationship between the rotation speed and the q-axis current when the torque is a predetermined value.

FIG. 12 is a graph illustrating a relationship between the rotation speed $\omega_m$ and the q-axis current $i_q$ (arbitrary unit: the same unit as in FIG. 11) when the torque $\tau$ is a predetermined value. The solid line illustrates a case in which $\omega_m > v2$ and the voltage reduction control is employed, and the broken line illustrates a case in which $\omega_m > v2$ and the flux-weakening control is employed. In the illustrated cases, the maximum torque/current control is employed when $\omega_m \leq v1$ and the flux-weakening control is employed when $v1 < \omega_m \leq v2$.

That is, when the rotation speed $\omega_m$ exceeds the speed v2, the controller 209 causes the output circuit 210 to output, to the motor 1, the alternating currents Iu, Iv, and Iw having a q-axis component the value of which is smaller than the value of the q-axis current $i_q$ employed during the flux-weakening control.

The d-axis current $i_d$ and the q-axis current $i_q$ obtained from simultaneous equations of Expressions (6), (7), and (8) where $\omega = P_n \cdot \omega_m$ are a d-axis current and a q-axis current, respectively, employed during the flux-weakening control. The d-axis current $i_d$ and the q-axis current $i_q$ obtained from simultaneous equations of Expressions (6), (7), and (8) in which the left side of Expression (6) is $\omega = P_n \cdot v1$ is the values $i_d 0$ and $i_q 0$.

Figure 13:
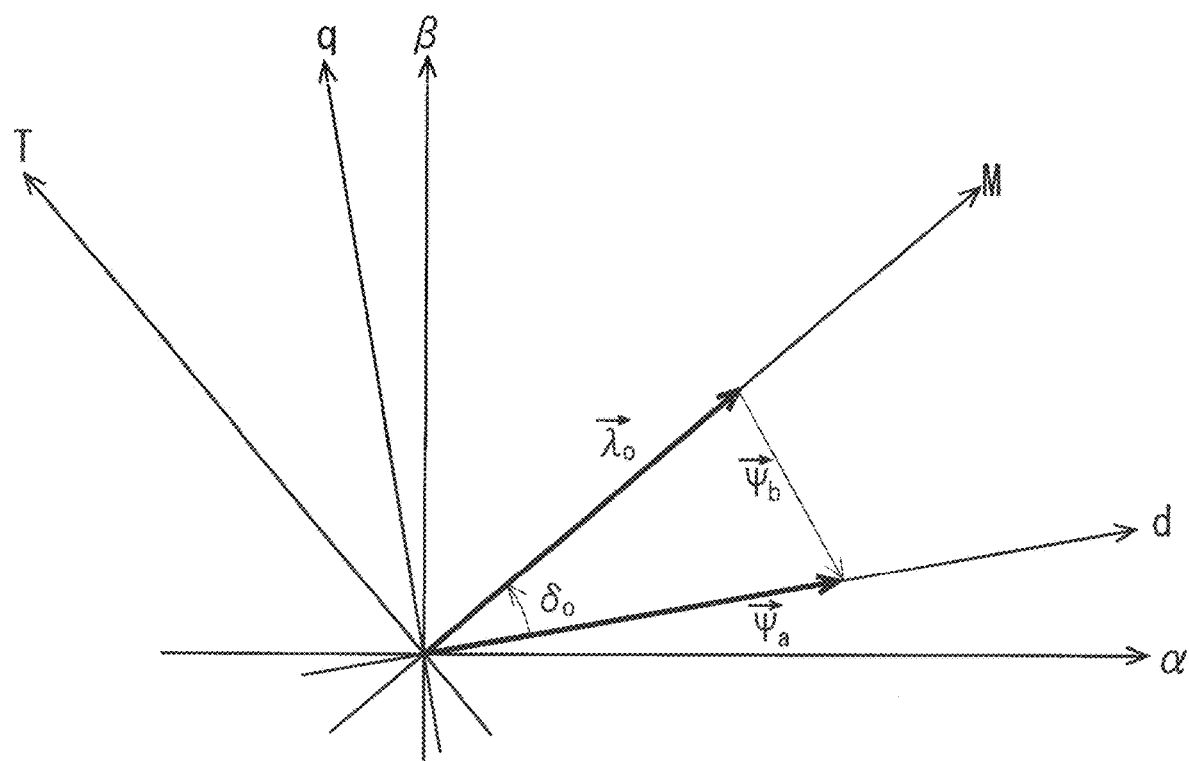
FIG. 13 is a vector diagram illustrating a relationship between a field magnetic flux vector, a magnetic flux vector attributed to an armature reaction, and a primary magnetic flux vector.

FIG. 13 is a vector diagram illustrating a relationship between a field magnetic flux vector $\psi_a$, a magnetic flux vector $\psi_b$ attributed to an armature reaction, and a primary magnetic flux vector $\lambda_0$. In FIG. 13, in order to explicitly indicate that these magnetic flux vectors $\psi_a$, $\psi_b$, and $\lambda_0$ are vectors, arrows are shown for the respective symbols. Note that, by using the same symbols, amplitudes of these vectors are also referred to as field magnetic flux $\psi_a$, magnetic flux $\psi_b$, and primary magnetic flux $\lambda_0$ in the description of this embodiment.

The primary magnetic flux vector $\lambda_0$ is a composite of a magnetic flux vector $(-\psi_b)$ and the field magnetic flux vector $\psi_a$. A load angle $\delta_0$ is a phase of the primary magnetic flux vector $\lambda_0$ with respect to the field magnetic flux vector $\psi_a$. The primary magnetic flux $\lambda_0$ is represented as Expression (11). There is a relationship of Expression (12) between the primary magnetic flux $\lambda_0$ and the load angle $\delta_0$.

$$\lambda_o = \sqrt{(\Psi_a + L_d i_d)^2 + (L_q i_q)^2} \quad (11)$$

$$\begin{cases} \lambda_o \cos\delta_o = L_d i_d + \Psi_a \\ \lambda_o \sin\delta_o = L_q i_q \end{cases} \quad (12)$$

An $\alpha$-axis and a $\beta$-axis are coordinate axes of a fixed coordinate system in the motor 1. The d-axis and the q-axis are coordinate axes of a rotary coordinate system, meaning of each of which is described above. The field magnetic flux vector $\psi_a$ and the d-axis have the same phase and the same direction in a vector diagram. An M-axis and a T-axis indicate coordinate axes that advance in the same phase as the primary magnetic flux vector $\lambda_0$ and 90 degrees with respect to this, respectively. The primary magnetic flux vector $\lambda_0$ and the M-axis have the same direction in a vector diagram. Hereinafter, an M-axis component and a T-axis component of the three-phase alternating currents Iu, Iv, and Iw output to the motor 1 are also referred to as M-axis current $i_M$ and T-axis current $i_T$. The T-axis current $i_T$ is represented as Expression (13).

$$i_r = -i_d \sin\delta_o + i_q \cos\delta_o \quad (13)$$

FIG. 14 is a graph illustrating a relationship between the T-axis current $i_T$ (arbitrary unit) and the axial deviation $\delta_C$ in which the rotation speed $\omega_m$ is a parameter. Note that the torque $\tau$ is fixed.

FIG. 14 illustrates a relationship between the axial deviation $\delta_C$ and the T-axis current $i_T$ when the rotation speed $\omega_m$ becomes a speed v1, v5, v6, or v7. When the torque $\tau$ is maintained, as the T-axis current $i_T$ for achieving the rotation speed $\omega_m$ is larger, the axial deviation $\delta_C$ is smaller. As the rotation speed $\omega_m$ is higher, the axial deviation $\delta_C$ is larger.

In FIG. 14, the value of the axial deviation $\delta_C$ (this corresponds to the upper limit value $\delta_{Co}$) with the T-axis current $i_T$ employed during the flux-weakening control when the rotation speed $\omega_m$ becomes a speed v2 is additionally plotted. In this case, the amplitude |Vs| becomes the voltage value Vmax, and the T-axis current $i_T$ becomes a value $i_T\hat{}$ obtained as described later. When the rotation speed $\omega_m$ is lower than or equal to the speed v1 during the maximum torque/current control, the T-axis current $i_T$ becomes a value $i_T 0$.

Thus, when the rotation speed $\omega_m$ exceeds the speed v2, the T-axis current $i_T$ becomes a value larger than the value employed during the flux-weakening control (this is larger than the value $i_T\hat{}$), so that the above-described voltage reduction control can be performed.

FIG. 15 is a graph illustrating a relationship between the rotation speed $\omega_m$ and the T-axis current $i_T$ (arbitrary unit: the same unit as in FIG. 14) when the torque $\tau$ is a predetermined value. The solid line illustrates a case in which $\omega_m > v2$ and the voltage reduction control is employed, and the broken line illustrates a case in which $\omega_m > v2$ and the flux-weakening control is employed. In the illustrated cases, the maximum torque/current control is employed when $\omega_m \leq v1$ and the flux-weakening control is employed when $v1 < \omega_m \leq v2$.

That is, when the rotation speed $\omega_m$ exceeds the speed v2, the controller 209 causes the output circuit 210 to output, to the motor 1, the alternating currents Iu, Iv, and Iw having a T-axis component (T-axis current $i_T$) the value of which is larger than the value of the T-axis component of the alternating currents Iu, Iv, and Iw output to the motor 1 in a case in which the flux-weakening control is performed at the speed.

The T-axis current $i_T$ obtained from simultaneous equations of Expressions (6), (7), (8), (12), and (13) where $\omega = P_n \cdot \omega_m$ is the value of the T-axis current $i_T$ in a case in which the flux-weakening control is performed. The T-axis current $i_T$ obtained from simultaneous equations of Expressions (6), (7), (8), (12), and (13) in which the left side of Expression (6) is $\omega = P_n \cdot v1$ is the value $i_T 0$.

Figure 16:
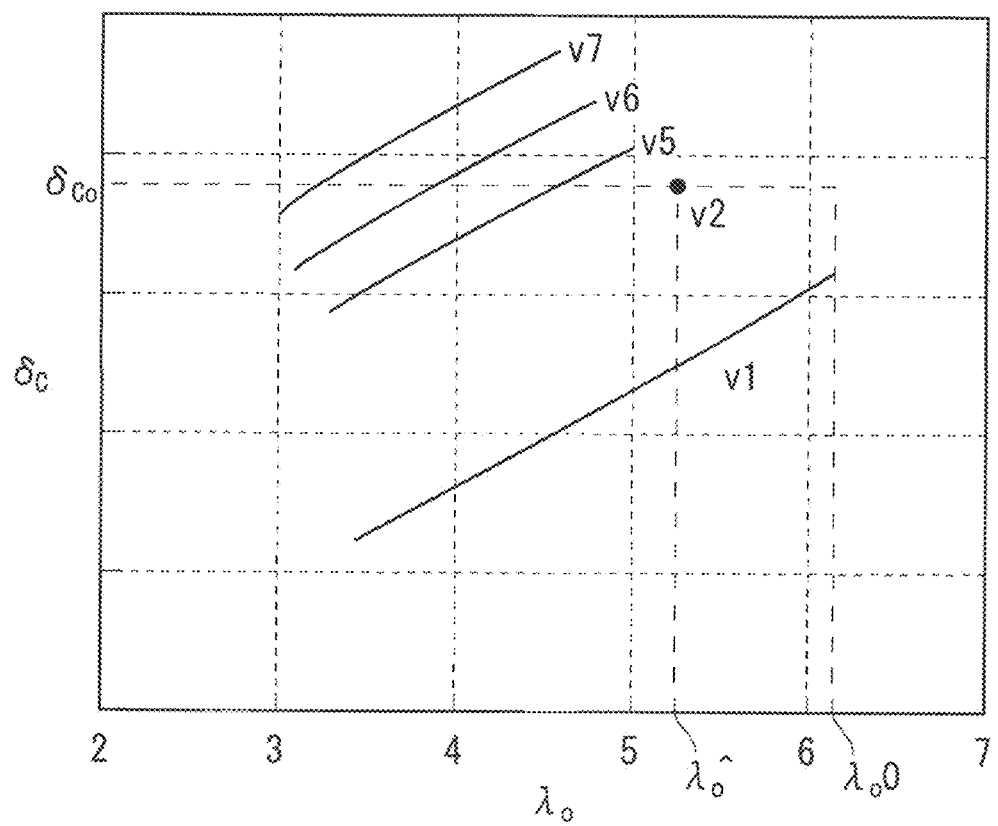
FIG. 16 is a graph illustrating a relationship between a primary magnetic flux and the axial deviation in which the rotation speed is a parameter.

FIG. 16 is a graph illustrating a relationship between the primary magnetic flux $\lambda_0$ (arbitrary unit) and the axial deviation $\delta_C$ in which the rotation speed $\omega_m$ is a parameter. Note that the torque $\tau$ is fixed.

FIG. 16 illustrates a relationship between the axial deviation $\delta_C$ and the primary magnetic flux $\lambda_0$ when the rotation speed $\omega_m$ becomes a speed v1, v5, v6, or v7. When the torque $\tau$ is maintained, as the primary magnetic flux $\lambda_0$ for achieving the rotation speed $\omega_m$ is larger, the axial deviation $\delta_C$ is larger. As the rotation speed $\omega_m$ is higher, the axial deviation $\delta_C$ is larger.

In FIG. 16, the value of the axial deviation $\delta_C$ (this corresponds to the upper limit value $\delta_{Co}$) with the primary magnetic flux $\lambda_0$ employed during the flux-weakening control when the rotation speed $\omega_m$ becomes a speed v2 is additionally plotted. In this case, the amplitude |Vs| becomes the voltage value Vmax, and the primary magnetic flux $\lambda_0$ becomes a value $\lambda_0\hat{}$ obtained as described later. When the rotation speed $\omega_m$ is lower than or equal to the speed v1 during the maximum torque/current control, the primary magnetic flux $\lambda_0$ becomes a value $\lambda_0 0$.

Thus, when the rotation speed $\omega_m$ exceeds the speed v2, the primary magnetic flux $\lambda_0$ having a value smaller than the value of the primary magnetic flux in a case in which the flux-weakening control is performed is generated, so that the above-described voltage reduction control can be performed.

Figure 17:
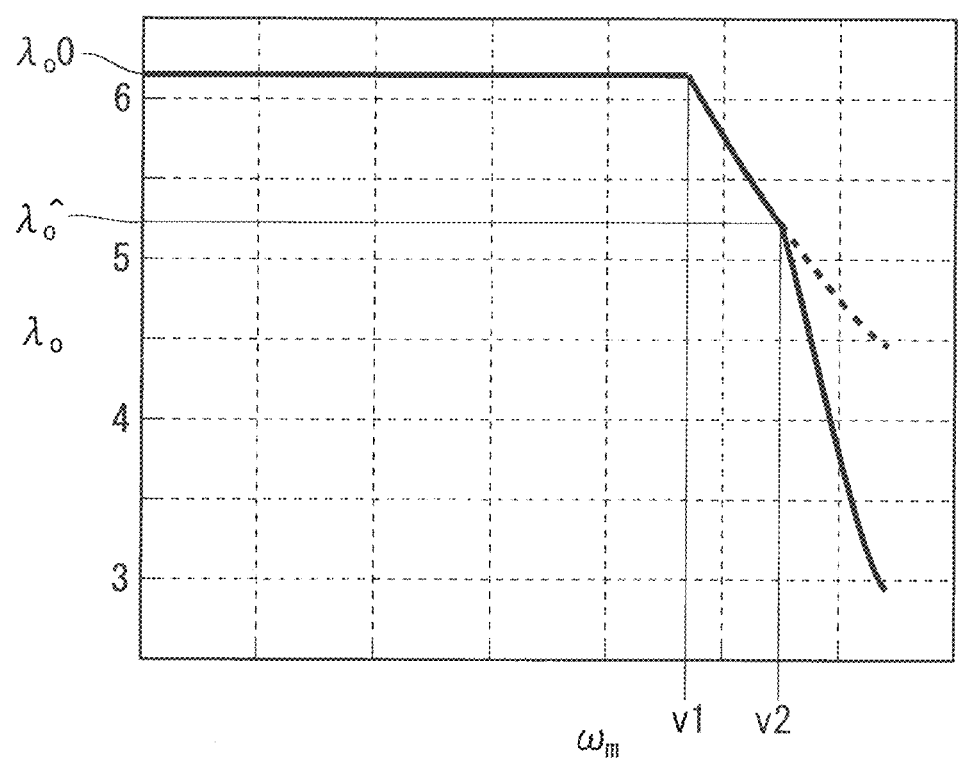
FIG. 17 is a graph illustrating a relationship between the rotation speed and the primary magnetic flux when the torque is a predetermined value.

FIG. 17 is a graph illustrating a relationship between the rotation speed $\omega_m$ and the primary magnetic flux $\lambda_0$ (arbitrary unit: the same unit as in FIG. 16) when the torque $\tau$ is a predetermined value. The solid line illustrates a case in which $\omega_m > v2$ and the voltage reduction control is employed, and the broken line illustrates a case in which $\omega_m > v2$ and the flux-weakening control is employed. In the illustrated cases, the maximum torque/current control is employed when $\omega_m \leq v1$ and the flux-weakening control is employed when $v1 < \omega_m \leq v2$.

That is, when the rotation speed $\omega_m$ exceeds the speed v2, the controller 209 causes the output circuit 210 to output, to the motor 1, the alternating currents Iu, Iv, and Iw that causes the motor 1 to generate the primary magnetic flux $\lambda_0$ smaller than the value of the primary magnetic flux in a case in which the flux-weakening control is performed.

The primary magnetic flux $\lambda_0$ obtained from simultaneous equations of Expressions (6), (7), (8), and (11) where $\omega = P_n \cdot \omega_m$ is the value of the primary magnetic flux $\lambda_0$ in a case in which the flux-weakening control is performed. The primary magnetic flux $\lambda_0$ obtained from simultaneous equations of Expressions (6), (7), (8), and (11) in which the left side of Expression (6) is $\omega = P_n \cdot v1$ is the value $\lambda_0 0$.

FIG. 18 is a graph illustrating a relationship between the load angle $\delta_0$ and the axial deviation $\delta_C$ in which the rotation speed $\omega_m$ is a parameter. Note that the torque is fixed.

FIG. 18 illustrates a relationship between the axial deviation $\delta_C$ and the load angle $\delta_0$ when the rotation speed $\omega_m$ becomes a speed v1, v5, v6, or v7. When the torque $\tau$ is maintained, as the load angle $\delta_0$ for achieving the rotation speed $\omega_m$ is larger, the axial deviation $\delta_C$ is smaller. As the rotation speed $\omega_m$ is higher, the axial deviation $\delta_C$ is larger.

In FIG. 18, the value of the axial deviation $\delta_C$ (this corresponds to the upper limit value $\delta_{Co}$) with the load angle $\delta_0$ employed during the flux-weakening control when the rotation speed $\omega_m$ becomes a speed v2 is additionally plotted. In this case, the amplitude |Vs| becomes the voltage value Vmax, and the load angle $\delta_0$ becomes a value $\delta_0\hat{}$ obtained as described later. When the rotation speed $\omega_m$ is lower than or equal to the speed v1 during the maximum torque/current control, the load angle $\delta_0$ becomes a value $\delta_0 0$.

Thus, when the rotation speed $\omega_m$ exceeds the speed v2, the load angle $\delta_0$ becomes a value larger than the value of the load angle in a case in which the flux-weakening control is performed, so that the above-described voltage reduction control can be performed.

FIG. 19 is a graph illustrating a relationship between the rotation speed $\omega_m$ and the load angle $\delta_0$ when the torque $\tau$ is a predetermined value. The solid line illustrates a case in which $\omega_m > v2$ and the voltage reduction control is employed, and the broken line illustrates a case in which $\omega_m > v2$ and the flux-weakening control is employed. In the illustrated cases, the maximum torque/current control is employed when $\omega_m \leq v1$ and the flux-weakening control is employed when $v1 < \omega_m \leq v2$.

That is, when the rotation speed $\omega_m$ exceeds the speed v2, the controller 209 causes the output circuit 210 to output the alternating currents Iu, Iv, and Iw that causes the motor 1 to generate the load angle $\delta_0$ larger than the value of the load angle in a case in which the flux-weakening control is performed.

The load angle $\delta_0$ obtained from simultaneous equations of Expressions (6), (7), (8), and (12) where $\omega = P_n \cdot \omega_m$ is the value of the load angle $\delta_0$ in a case in which the flux-weakening control is performed. The load angle $\delta_0$ obtained from simultaneous equations of Expressions (6), (7), (8), and (12) in which the left side of Expression (6) is $\omega = P_n \cdot v1$ is the value $\delta_0 0$.

FIG. 20 is a graph illustrating a relationship between an instantaneous real power Po (arbitrary unit) and the axial deviation $\delta_C$ in which the rotation speed $\omega_m$ is a parameter. Note that the torque is fixed.

FIG. 20 illustrates a relationship between the axial deviation $\delta_C$ and the instantaneous real power Po when the rotation speed $\omega_m$ becomes a speed v1, v5, v6, or v7. The instantaneous real power Po is an instantaneous real power supplied from the output circuit 210 to the motor 1. In other words, the instantaneous real power Po is an instantaneous real power generated by the motor 1. Po=vd·id+vq·iq and, for example, can be calculated by $v_d^* \cdot i_d + v_q^* \cdot i_q$ by using the command values $v_d^*$ and $v_q^*$.

When the torque $\tau$ is maintained, as the instantaneous real power Po for achieving the rotation speed $\omega_m$ is larger, the axial deviation $\delta_C$ is smaller. As the rotation speed $\omega_m$ is higher, the axial deviation $\delta_C$ is larger.

In FIG. 20, the value of the axial deviation $\delta_C$ (this corresponds to the upper limit value $\delta_{Co}$) with the instantaneous real power Po employed during the flux-weakening control when the rotation speed $\omega_m$ becomes a speed v2 is additionally plotted. In this case, the amplitude |Vs| becomes the voltage value Vmax, and the instantaneous real power Po becomes a value Po$\hat{}$ (=$v_d^* \cdot i_d\hat{} + v_q^* \cdot i_q\hat{}$). When the rotation speed $\omega_m$ is lower than or equal to the speed v during the maximum torque/current control, the instantaneous real power Po becomes less than or equal to a value Po0 (=$v_d^* \cdot i_d 0 + v_q^* \cdot i_q 0$).

Thus, when the rotation speed $\omega_m$ exceeds the speed v2, the instantaneous real power Po becomes a value larger than the value of the instantaneous real power in a case in which the flux-weakening control is performed, so that the above-described voltage reduction control can be performed.

Figure 21:
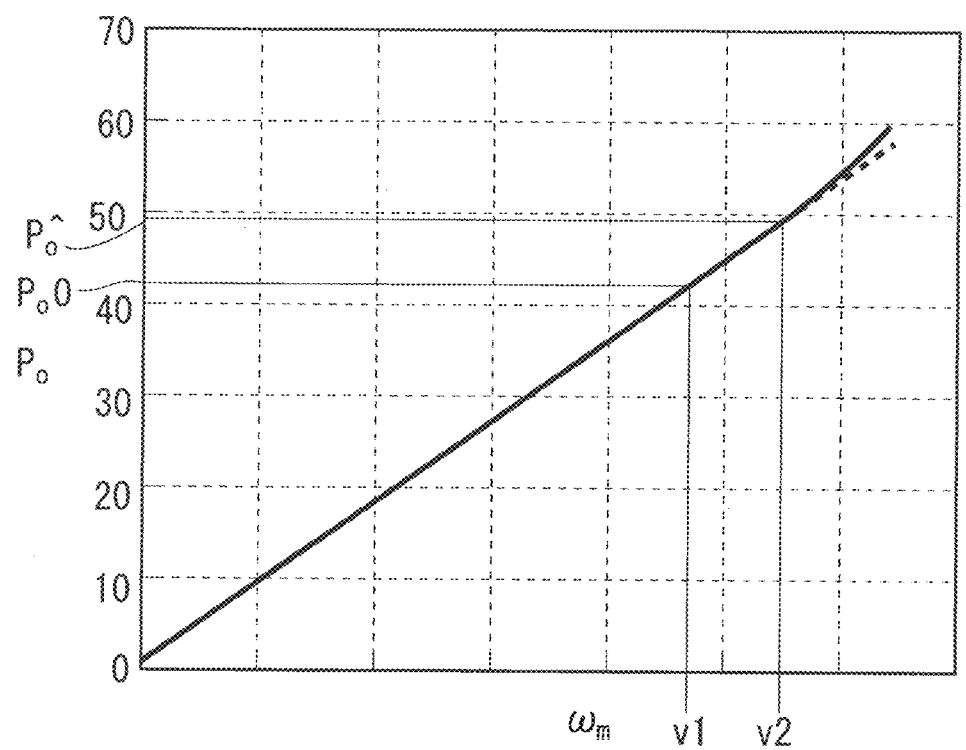
FIG. 21 is a graph illustrating a relationship between the rotation speed and the instantaneous real power when the torque is a predetermined value.

FIG. 21 is a graph illustrating a relationship between the rotation speed $\omega_m$ and the instantaneous real power Po (arbitrary unit: the same unit as in FIG. 20) when the torque τ is a predetermined value. The solid line illustrates a case in which $\omega_m$>v2 and the voltage reduction control is employed, and the broken line illustrates a case in which $\omega_m$>v2 and the flux-weakening control is employed. In the illustrated cases, the maximum torque/current control is employed when $\omega_m$≤v1 and the flux-weakening control is employed when v1<$\omega_m$≤v2.

That is, when the rotation speed $\omega_m$ exceeds the speed v2, the controller 209 causes the output circuit 210 to output, to the motor 1, the instantaneous real power Po larger than the value of the instantaneous real power in a case in which the flux-weakening control is performed.

Figure 22:
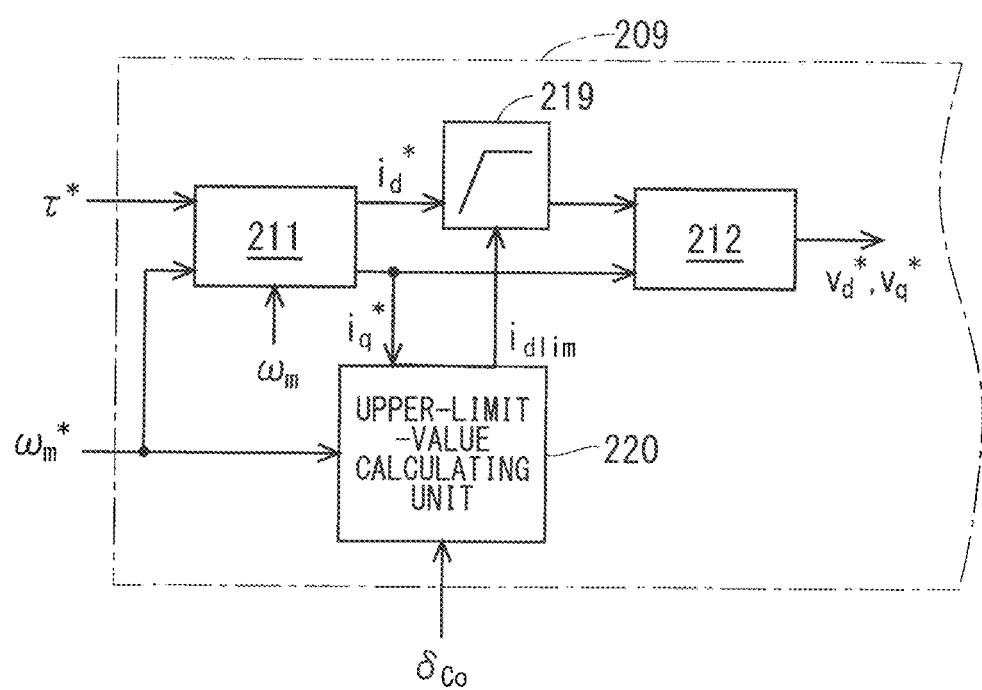
FIG. 22 is a block diagram illustrating a first modification of the controller.

FIG. 22 is a block diagram illustrating a first modification of the controller 209. The first modification extracts and illustrates only the current command generating unit 211, the current controller 212 and a periphery thereof illustrated in FIG. 2. In the first modification, a limiter 219 is provided between the current command generating unit 211 and the current controller 212 in the controller 209, and the command value $i_d^*$ of the d-axis current $i_d$ is limited to less than or equal to an upper limit value $i_{dlim}$. Specifically, if the command value $i_d^*$ obtained from the current command generating unit 211 exceeds the upper limit value $i_{dlim}$, the limiter 219 inputs the upper limit value $i_{dlim}$ as the command value $i_d^*$ to the current controller 212.

In the first modification, an upper-limit-value calculating unit 220 is further provided in the controller 209. The upper-limit-value calculating unit 220 calculates the upper limit value $i_{dlim}$ by using the command value $i_q^*$ of the q-axis current $i_q$, the command value Om of the rotation speed $\omega_m$, and the upper limit value $\delta_{Co}$ of the axial deviation $\delta_C$. Expression (5) can be modified into Expression (14).

$$i_d = \frac{-b + \sqrt{b^2 - 4a\left(c + \frac{\omega_m^2(k_A m_A r_A + k_C m_C r_C)}{k_B \delta_{co}}\right)}}{2a} \quad (14)$$

In Expression (14), the upper limit value $i_{dlim}$ can be calculated as the value of the d-axis current $i_d$ obtained by employing the command value $\omega_m^*$ as the rotation speed $\omega_m$.

As described above, in order to reduce the axial deviation $\delta_C$ as much as possible, the d-axis current $i_d$ is desirably the value (−b/2a). Thus, it is desirable not to satisfy $i_{dlim}$<(−b/2a). If $i_{dlim}$<(−b/2a), for example, control for reducing the command value $\omega_m^*$ (droop control) is desirably performed.

Figure 23:
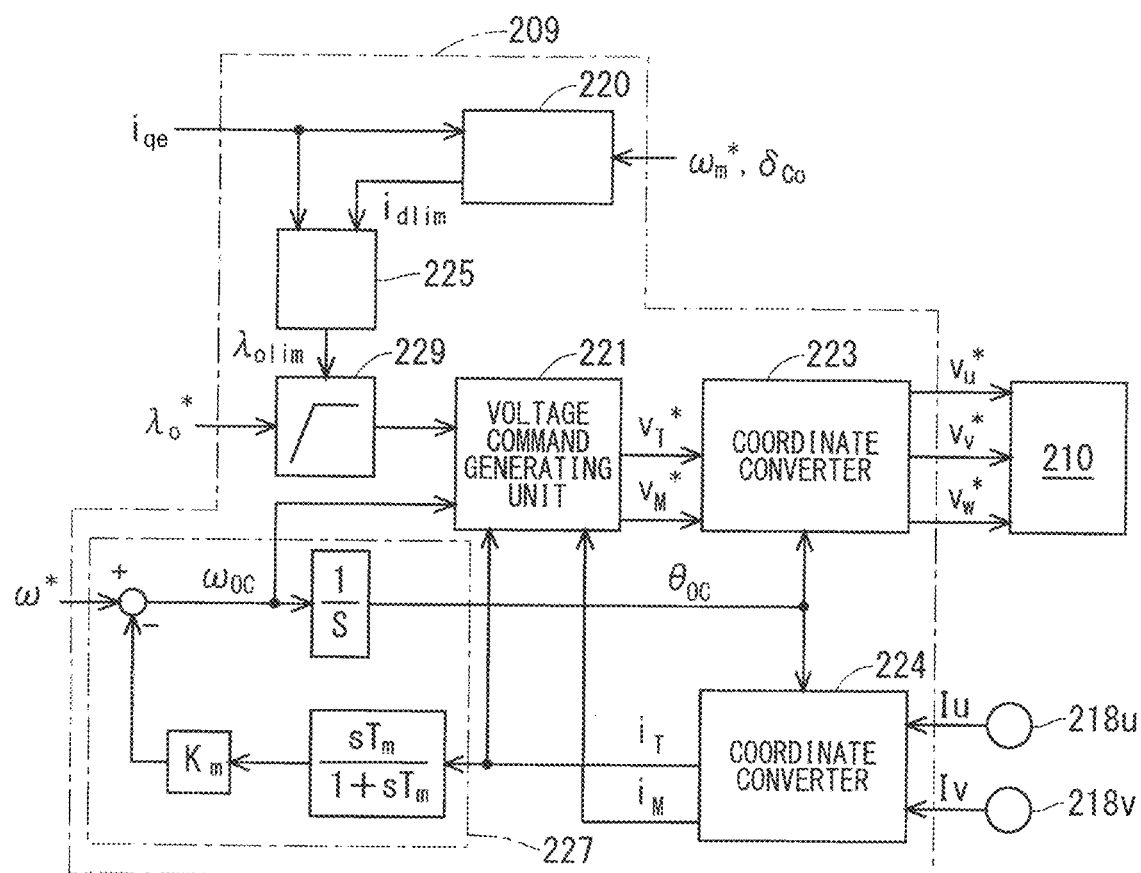
FIG. 23 is a block diagram illustrating a second modification of the controller.

FIG. 23 is a block diagram illustrating a second modification of the controller 209. The second modification can be employed for so-called primary magnetic flux control in which the primary magnetic flux $\lambda_0$ is controlled.

The controller 209 includes, for example, a voltage command generating unit 221, coordinate converters 223 and 224, and an angle calculating unit 227.

From a command value ω* of a rotation speed ω as an electric angle and the T-axis current $i_T$, by using a known method, the angle calculating unit 227 obtains a rotation speed $\omega_{OC}$ of the M-axis and further obtains a position $\theta_{OC}$ of the M-axis. From the values of the alternating currents Iu and Iv and the position $\theta_{OC}$, the coordinate converter 224 obtains the M-axis current $i_M$ and the T-axis current $i_T$.

The voltage command generating unit 221 obtains the M-axis current $i_M$, the T-axis current $i_T$, and a command value $\lambda_0^*$ of the primary magnetic flux $\lambda^0$, and, from the rotation speed $\omega_{OC}$, a command value $v_T^*$ of a T-axis voltage $v_T$ and a command value $v_M^*$ of the M-axis voltage $v_M$.

From the command values $v_T^*$ and $v_M^*$ and the position $\theta_{OC}$, the coordinate converter 223 generates the three-phase voltage command values $v_u^*$, $v_v^*$, and $v_w^*$.

The controller 209 further includes a limiter 229, the upper-limit-value calculating unit 220, and an upper-limit-value calculating unit 225. The limiter 229 limits the command value $\lambda_0^*$ of the primary magnetic flux $\lambda_0$ to less than or equal to an upper limit value $\lambda_{0lim}$. Specifically, if the command value $\lambda_0^*$ exceeds the upper limit value $\lambda_{0lim}$, the limiter 229 inputs the upper limit value $\lambda_{0lim}$ as the command value $\lambda_0^*$ to the voltage command generating unit 221.

The upper-limit-value calculating unit 220 can calculate the upper limit value $i_{dlim}$ as the value of the d-axis current $i_d$ obtained by employing the command value $\omega_m^*$ as the rotation speed $\omega_m$ and an estimated value $i_{qe}$ as the q-axis current $i_q$ in Expression (14).

The upper-limit-value calculating unit 225 can calculate the upper limit value $\lambda_{0lim}$ as the value of the primary magnetic flux $\lambda_0$ obtained by employing $i_d=i_{dlim}$ and $i_q=i_{qe}$ in Expression (11).

Expression (12) can be modified into Expression (15). From Expressions (4) and (15), Expression (16) can be obtained. From Expression (16), if the load angle $\delta_0$ and the axial deviation $\delta_C$ are fixed, it is found that the square of the rotation speed $\omega_m$ is in direct proportion to a quadratic expression of the primary magnetic flux $\lambda_0$.

$$\begin{cases} i_d = \dfrac{\lambda_o \cos\delta_o - \Psi_a}{L_d} \\ i_q = \dfrac{\lambda_o \sin\delta_o}{L_d} \end{cases} \quad (15)$$

$$\omega_n^2 = -\frac{k_8 \delta_{co}}{k_A m_A r_A + k_C m_C r_C}\left(a\left\{\frac{\lambda_o \cos\delta_o - \Psi_a}{L_d}\right\}^2 + b\left\{\frac{\lambda_o \cos\delta_o - \Psi_a}{L_d}\right\} + \frac{x}{g}\cdot\frac{\pi}{2\mu_0}\cdot\left\{\begin{array}{l}+(F_M^2)^2[(P_{d0}+P_{d1})^2+P_{d1}^2]+ \\ \left(F_D\dfrac{\lambda_o \sin\delta_o}{L_q}\right)^2[(P_{q0}-P_{q1})^2+P_{q1}^2]^2\end{array}\right\}\right) \quad (16)$$

$$= -\frac{k_B \delta_{co}}{k_A m_A r_A + k_C m_C r_C}\left(a\left\{\frac{\lambda_o \cos\delta_o - \Psi_a}{L_d}\right\}^2 + b\left\{\frac{\lambda_o \cos\delta_o - \Psi_a}{L_d}\right\} + d + e\left\{\frac{\lambda_o \sin\delta_o}{L_q}\right\}^2\right)$$

-continued $$= -\frac{k_B \delta_c}{k_A m_A r_A + k_C m_C r_C}\left\{\left(\frac{a\cos^2\delta_o}{L_d^2} + \frac{e\sin^2\delta_o}{L_q^2}\right)\lambda_o^2 + \left(-\frac{a2\cos\delta_o\Psi_a}{L_d^2} + \frac{b\cos\delta_o}{L_d}\right)\lambda_o + \left(\frac{a\Psi_a^2}{L_d^2} - \frac{b\Psi_a}{L_d} + d\right)\right\}$$

where 
$$\begin{cases} d = \frac{x}{g} \cdot \frac{\pi}{2\mu_0}(F_M^2)\left[(P_{d0} + P_{d1})^2 + P_{d1}^2\right] \\ e = \frac{x}{g} \cdot \frac{\pi}{2\mu_0}(F_D)^2\left[(P_{q0} - P_{q1})^2 + P_{q1}^2\right] \end{cases}$$

The upper limit value $\lambda_{0lim}$ may also be obtained according to Expression (16) in which $\delta_C = \delta_{Co}$ and $\omega_m = \omega_m^*$.

As described above, the motor control device 200 includes the PWM inverter 210b and the controller 209. The PWM inverter 210b outputs, to the motor 1, the application voltage Vs to be applied to the motor 1. The controller 209 controls operation of the PWM inverter 210b. The motor 1 drives the compression mechanism 20, which is the load, by using rotation of the shaft 10. The PWM inverter 210b is included in the output circuit 210.

In the above-described embodiment, for example, in a case in which the predetermined torque t is caused to be output from the motor 1,
(i) when the rotation speed $\omega_m$ is lower than or equal to the speed v1, as the rotation speed $\omega_m$ is higher, the amplitude |Vs| is larger (e.g., the maximum torque/current control or the maximum efficiency control);
(ii) the amplitude |Vs| when the rotation speed Om is higher than the speed v2 ($\geq$v1) is less than the voltage value Vmax of the amplitude |Vs| at the speed v1 (the voltage reduction control); and
(iii) the amplitude |Vs| when the rotation speed $\omega_m$ is higher than the speed v1 and lower than or equal to the speed v2 is the voltage value Vmax (e.g., the flux-weakening control).

For example, during the voltage reduction control, when the rotation speed $\omega_m$ is higher than the speed v2, as the rotation speed $\omega_m$ is higher, the amplitude |Vs| is smaller.

In a case in which the motor 1 is caused to generate the predetermined torque T, when the rotation speed $\omega_m$ exceeds the speed v2, the controller 209 causes the PWM inverter 210b to, for example:
(iia) output, to the motor 1, the alternating currents Iu, Iv, and Iw with the phase β larger than the phase β of the alternating currents Iu, Iv, and Iw output to the motor 1 when the flux-weakening control is applied at the rotation speed;
(iib) output, to the motor 1, the alternating currents Iu, Iv, and Iw from which the current vector Ia with the current amplitude ia larger than the current amplitude ia of the current vector Ia of the alternating currents Iu, Iv, and Iw output to the motor 1 when the flux-weakening control is applied at the rotation speed can be obtained;
(iic) output, to the motor 1, the alternating currents Iu, Iv, and Iw having a d-axis component (d-axis current $i_d$) smaller than the d-axis component (value is of the d-axis current $i_d$) of the alternating currents Iu, Iv, and Iw output to the motor 1 when the flux-weakening control is applied at the rotation speed;
(iid) output, to the motor 1, the alternating currents Iu, Iv, and Iw having a q-axis component (q-axis current $i_q$) smaller than the q-axis component (value $i_q$ of the q-axis current $i_q$) of the alternating currents Iu, Iv, and Iw output to the motor 1 when the flux-weakening control is applied at the rotation speed;
(iie) output, to the motor 1, the alternating currents Iu, Iv, and Iw having a T-axis component (T-axis current $i_T$) larger than the T-axis component (value it of the T-axis current $i_T$) of the alternating currents Iu, Iv, and Iw output to the motor 1 when the flux-weakening control is applied at the rotation speed;
(iif) output, to the motor 1, the alternating currents Iu, Iv, and Iw that causes the motor 1 to generate the primary magnetic flux $\lambda_0$ with an amplitude smaller than the primary magnetic flux (more strictly, the value $\lambda_0$ of the amplitude) generated in the motor 1 when the flux-weakening control is applied at the rotation speed;
(iig) output, to the motor 1, the alternating currents Iu, Iv, and Iw that causes the motor 1 to generate the primary magnetic flux $\lambda_0$ with a load angle $\delta_0$ larger than the load angle $\delta_0$ of the primary magnetic flux $\lambda_0$ generated in the motor 1 when the flux-weakening control is applied at the rotation speed; or
(iih) output, to the motor 1, the instantaneous real power Po larger than the instantaneous real power generated in the motor 1 when the flux-weakening control is applied at the rotation speed.

It is not always necessary to employ the maximum torque/current control, the maximum efficiency control, or the flux-weakening control. Typically, the maximum rotation speed of a motor employed in a product system is determined depending on the product system. The product system herein includes, in terms of the embodiment, the motor 1, the motor control device 200, and the compression mechanism 20 driven by the motor 1. The maximum amplitude |Vs| depends on the rotation speed $\omega_m$.

For convenience of the following description, various quantities are defined. The maximum rotation speed $\omega_m$ of the motor 1 determined depending on the product system is a speed $\omega_{MAX}$. A possible maximum value of the amplitude |Vs| when the motor 1 rotates at the speed $\omega_{MAX}$ is a voltage value $V_{max\_\omega_{MAX}}$. A possible maximum value of the amplitude |Vs| when the motor 1 rotates at a speed ω3 lower than the speed $\omega_{MAX}$ is a voltage value $V_{max\_}\omega 3$.

As described above, as the rotation speed is higher, the axial deviation $\delta_C$ is larger. The axial deviation $\delta_C$ can be decreased by decreasing the amplitude |Vs|. Thus, when the motor 1 rotates at the speed $\omega_{MAX}$, the PWM inverter 210b desirably outputs the application voltage Vs smaller than the voltage value $V_{Max\_\omega_{Max}}$.

On the other hand, in order to reduce current to be consumed, the amplitude |Vs| desirably becomes the possible maximum when the motor 1 rotates. Thus, at the at least one speed ω3, the PWM inverter 210b desirably outputs the application voltage Vs with the amplitude |Vs| of the voltage value $V_{max\_}\omega 3$.

These can be summarized and expressed as follows:
(a) the PWM inverter 210b is caused to output the application voltage Vs having the amplitude |Vs| smaller than the voltage value $V_{max\_\omega_{MAX}}$, and the motor 1 is caused to rotate at the speed $\omega_{MAX}$ and drive a load (e.g., the compression mechanism 20); and
(b) the PWM inverter 210b is caused to output the application voltage Vs having the amplitude |Vs| of the voltage value $V_{max\_}\omega 3$, and the motor 1 is caused to rotate at the speed $\omega 3$ ($<\omega_{MAX}$) and drive the load; in which (c) the voltage value $V_{max\_}\omega_{MAX}$ is a possible maximum value of the amplitude |Vs| when the motor drives the load at the speed $\omega_{MAX}$;

(d) the speed $\omega_{MAX}$ is a maximum of the rotation speed $\omega_m$ when the motor 1 drives the load;

(e) the voltage value $V_{max\_}\omega 3$ is a possible maximum value of the amplitude |Vs| when the motor 1 drives the load at the speed $\omega 3$; and (f) the speed $\omega 3$ is lower than the speed $\omega_{MAX}$ (the above conditions are not necessarily satisfied at all rotation speeds $\omega_m$ smaller than the speed $\omega_{MAX}$).

In other words:

(g) at the speed $\omega_{MAX}$, the ratio of the amplitude |Vs| to the voltage value $V_{max\_}\omega_{MAX}$ is smaller than 1; and (h) at the speed $\omega 3$ lower than the speed $\omega_{MAX}$, the ratio of the amplitude |Vs| to the voltage value $V_{max\_}\omega 3$ is equal to 1.

Without limitation to when the motor 1 rotates at the speed $\omega_{MAX}$, as the rotation speed $\omega_m$ is higher, the axial deviation $\delta_C$ is larger. In addition, the voltage reduction control is performed at the rotation speed $\omega_m$ higher than or equal to the base speed (defined as a maximum rotation speed of the motor 1 at which the motor 1 can generate the torque $\tau$ during the maximum torque/current control or the maximum efficiency control). Thus, by adopting the base speed $\omega b$ when the motor 1 outputs the predetermined torque $\tau$, the speeds $\omega 1$ ($\geq \omega b$) and $\omega 2$ ($>\omega 1$), the voltage value $V_{max\_}\omega 1$ as the possible maximum of the amplitude |Vs| at rotation at the speed $\omega 1$, and the voltage value $V_{max\_}\omega 2$ as the possible maximum of the amplitude |Vs| at rotation at the speed $\omega 2$, there may be a relationship as follows.

When the motor 1 outputs the predetermined torque $\tau$, (i) the ratio of the amplitude |Vs| to the voltage value $V_{max\_}\omega 1$ at the certain speed $\omega 1$, which is higher than or equal to the base speed $\omega b$ when the predetermined torque $\tau$ is output is a first ratio;

(j) the ratio of the amplitude |Vs| to the voltage value $V_{max\_}\omega 2$ at the certain speed $\omega 2$ higher than the speed $\omega 1$ is a second ratio; and (k) the second ratio is smaller than the first ratio (the above conditions are not necessarily satisfied at all of two rotation speeds $\omega_m$ higher than or equal to the base speed $\omega b$).

In other words, in a case in which the rotation speed $\omega_m$ when the motor 1 outputs the predetermined torque $\tau$ is higher than or equal to the base speed $\omega b$ when the predetermined torque $\tau$ is output:

(l) the PWM inverter 210b is caused to output the application voltage Vs having the amplitude |Vs| obtained by multiplying the voltage value $V_{max\_}\omega 1$ by the first ratio, the motor 1 is caused to rotate at the speed $\omega 1$, and the motor 1 is caused to output the torque $\tau$;

(m) the PWM inverter 210b is caused to output the application voltage Vs having the amplitude |Vs| obtained by multiplying the voltage value $V_{max\_}\omega 2$ by the second ratio, the motor 1 is caused to rotate at the speed $\omega 2$, and the motor 1 is caused to output the torque $\tau$;

(n) the voltage value $V_{max\_}\omega 1$ is a possible maximum value of the amplitude |Vs| when the motor 1 outputs the torque $\tau$ at the speed $\omega 1$:

(o) the voltage value $V_{max\_}\omega 2$ is a possible maximum value of the amplitude |Vs| when the motor 1 outputs the torque $\tau$ at the speed $\omega 2$:

(p) the speed $\omega 2$ is higher than the speed $\omega 1$; and (q) the second ratio is smaller than the first ratio.

For the relationship $\omega 2 > \omega 1 > \omega b$, the speed $\omega 2$ may be a possible maximum $\omega_{max}$ of the rotation speed $\omega_m$ when the motor 1 outputs the torque $\tau$. When $\omega 1 = v1$, $V_{max}=V_{max\_}\omega 1$ is satisfied.

A case in which $v2 > \omega b$ and the torque $\tau$ is maintained is described with reference to FIG. 3 as an example. As described above, $v6 > v5 > v2$ is satisfied.

(l') The motor 1 is caused to rotate at the speed v5, and the amplitude |Vs| in this case has a value obtained by multiplying the first voltage value by the first ratio;

(m') the motor 1 is caused to rotate at the speed v6, and the amplitude |Vs| in this case has a value obtained by multiplying the second voltage value by the second ratio;

(n') the first voltage value is the possible maximum value of the amplitude |Vs| when the motor 1 outputs the torque $\tau$ at the speed v5;

(o') the second voltage value is the possible maximum value of the amplitude |Vs| when the motor 1 outputs the torque $\tau$ at the speed v6:

(p') the speed v6 is higher than the speed v5; and (q') the second ratio is smaller than the first ratio.

By the above-described control, the radial stress at a specific rotation angle when the motor 1 is rotating is reduced. This contributes to reduction of the uneven contact of the shaft 10 to the bearing 14.

Although the power source that supplies the DC voltage Vdc is provided outside the motor control device 200, the power source may alternatively be included in the motor control device 200. The power source can be realized, for example, an AC/DC converter. The amplitude |Vs| of the application voltage Vs output from the PWM inverter 210b in such a case will be described below.

The converter converts an AC voltage Vin into the DC voltage Vdc. In this conversion, an alternating current Iin flows into the converter and a direct current Idc is output. A power factor $\cos \Phi in$ on the input side of the converter and a loss Ploss1 at the time of conversion of the converter are adopted.

In the following description, the PWM inverter 210b outputs an AC voltage Vout and an alternating current Iout. A power factor $\cos \Phi out$ on the output side of the PWM inverter 210b and a loss Ploss2 at the time of conversion of the PWM inverter 210b are adopted.

Regarding the converter, the following Expression (17) is satisfied based on the law of the conservation of energy. In the first expression, the second term on the right side indicates voltage drop attributed to a converter loss. A transformer ratio a of the converter is adopted.

$$Vdc = Vin \times a - Ploss1/Idc, a = Iin \times \cos \Phi in/Idc \quad (17)$$

Regarding the PWM inverter 210b, the following Expression (18) is satisfied based on the law of the conservation of energy. In the first expression, the second term on the right side indicates voltage drop attributed to a converter loss. A modulation index b of the PWM inverter 210b is adopted.

$$Vout = Vdc \times b - Ploss2/(Iout \times \cos \Phi out), b = Idc/Iout/\cos \Phi out \quad (18)$$

From Expressions (17) and (18), the following expression is satisfied.

$$Vout = (Vin \times a - Ploss1/Idc) \times b - Ploss2/(Iout \times \cos\Phi \text{ out}) = \quad (19)$$
$$Vin \times a \times b - b \times Ploss1/Idc - Ploss2/(Iout \times \cos\Phi \text{ out})$$

From Expression (19), the AC voltage Vout output from the PWM inverter 210b is uniquely determined by the AC voltage Vin converted by the converter, the transformer ratio a, the modulation index b, the loss Ploss1 of the converter, the loss Ploss2 of the PWM inverter 210b, the direct current Idc input to the PWM inverter 210b, the alternating current Iout output from the PWM inverter 210b, and the power factor cos Φ out of the PWM inverter 210b. Note that the transformer ratio a, the modulation index b, the losses Ploss1 and Ploss2, the direct current Idc, the alternating current Iout, and the power factor cos Φ out are uniquely determined if the product system that employs the motor to which voltage is applied from the PWM inverter 210b, and the torque and rotation speed of the motor are determined.

Thus, the amplitude |Vs| in the above embodiment is uniquely determined if the power source voltage, the product system, the torque t, and the rotation speed $\omega_m$ are determined. However, in a case in which the power source that supplies the DC voltage Vdc is an AC/DC converter, the amplitude |Vs| is also dependent on the AC voltage Vin input to the converter.

The maximum of the amplitude |Vs| is further described. From Expression (19), the AC voltage Vout becomes a maximum when the transformer ratio a and the modulation index b are maximums. When maximums aMAX and bMAX of the transformer ratio a and the modulation index b, respectively, are adopted, a maximum VoutMAX of the AC voltage Vout is determined according to the following Expression (20).

$$VoutMAX = Vin \times aMAX \times bMAX - bMAX \times Ploss1/Idc - Ploss2/(Iout \times \cos\Phi out) \quad (20)$$

The maximums aMAX and bMAX are each uniquely determined according to product system. As described above, the amplitude |Vs| is uniquely determined if the power source voltage, the product system, the torque τ, and the rotation speed $\omega_m$ are determined. Thus, the maximum of the amplitude |Vs| is also uniquely determined if the power source voltage, the product system, the torque τ, and the rotation speed (o, are determined. For example, when the same torque τ is maintained in a certain product system at a certain power source voltage, the voltage values $V_{max\_}\omega 1$, $V_{max\_}\omega 2$, $V_{max\_}\omega 3$, and $V_{max\_}\omega_{MAX}$ are uniquely determined by the speeds ω1, ω2, ω3, and $\omega_{MAX}$, respectively.

However, in a case in which the power source that supplies the DC voltage Vdc is an AC/DC converter, these voltage values are also dependent on the AC voltage Vin input to the converter.

Although the embodiment has been described above, it should be understood that various modifications can be made for forms or details without departing from the spirit and scope of the claims. The above various embodiment and modifications can be mutually combined.

The invention claimed is:

1. An inverter control method for controlling an inverter that outputs an application voltage to be applied to a motor that drives a predetermined load by using rotation of a shaft, comprising:
    causing the inverter to output the application voltage with a first amplitude causing the motor to rotate at a first speed to drive the predetermined load; and
    causing the inverter to output the application voltage with a second amplitude causing the motor to rotate at a second speed to drive the predetermined load,
    wherein the first amplitude is smaller than a first maximum,
    an amplitude of the application voltage takes at most the first maximum when the motor drives the predetermined load at the first speed,
    wherein the first speed is a maximum of a rotation speed of the motor when the motor drives the predetermined load,
    wherein the second amplitude is a second maximum,
    the amplitude of the application voltage takes at most the second maximum when the motor drives the predetermined load at the second speed,
    wherein the second speed is lower than the first speed,
    wherein the second amplitude is higher than the first amplitude, and
    wherein an axial deviation is less than or equal to a predetermined value when the motor drives the predetermined load.

2. An inverter control method for controlling an inverter that outputs an application voltage to be applied to a motor that drives a load by using rotation of a shaft, comprising:
    in a case in which a rotation speed of the motor when the motor outputs a predetermined torque is higher than or equal to a base speed of the motor when the motor outputs the predetermined torque,
    causing the inverter to output the application voltage with a first amplitude obtained by multiplying a first maximum by a first ratio, causing the motor to rotate at a first speed, and causing the motor to output the predetermined torque; and
    causing the inverter to output the application voltage with a second amplitude obtained by multiplying a second maximum by a second ratio, causing the motor to rotate at a second speed, and causing the motor to output the predetermined torque,
    wherein an amplitude of the application voltage takes at most the first maximum when the motor outputs the predetermined torque at the first speed,
    wherein the amplitude of the application voltage takes at most the second amplitude when the motor outputs the predetermined torque at the second speed,
    wherein the second speed is higher than the first speed,
    wherein the second ratio is smaller than the first ratio,
    wherein the first ratio is defined as a ratio of amplitude of the application voltage to a possible maximum amplitude of the application voltage causing the motor to rotate at the first speed, and
    wherein the second ratio is defined as a ratio of amplitude of the application voltage to a possible maximum amplitude of the application voltage causing the motor to rotate at the second speed when the motor outputs the predetermined torque.

3. The inverter control method according to claim 2, wherein the second speed is a maximum that the rotation speed of the motor takes when the motor outputs the predetermined torque.

4. A motor control device comprising:
    an inverter that outputs an application voltage, which is a voltage to be applied to a motor that drives a predetermined load by using rotation of a shaft; and
    a controller that controls operation of the inverter, wherein the controller causes the inverter to output the application voltage with a first amplitude causing the motor to rotate at a first speed to drive the predetermined load, wherein the controller causes the inverter to output the application voltage with a second amplitude causing the motor to rotate at a second speed to drive the predetermined load, wherein the first amplitude is smaller than a first maximum, an amplitude of the application voltage takes at most the first maximum when the motor drives the predetermined load at the first speed, wherein the first speed is a maximum of a rotation speed of the motor when the motor drives the predetermined load, wherein the second amplitude is a second maximum, the amplitude of the application voltage takes at most the second maximum when the motor drives the predetermined load at the second speed, wherein the second speed is lower than the first speed, wherein the second amplitude is higher than the first amplitude, and wherein an axial deviation is less than or equal to a predetermined value when the motor drives the predetermined load.

5. A motor control device comprising:
an inverter that outputs an application voltage to be applied to a motor that drives a load by using rotation of a shaft; and
a controller that controls operation of the inverter,
wherein, in a case in which a rotation speed of the motor when the motor outputs a predetermined torque is higher than or equal to a base speed of the motor when the motor outputs the predetermined torque, the controller causes the inverter to output the application voltage with a first amplitude obtained by multiplying a first maximum by a first ratio, causes the motor to rotate at a first speed, and causes the motor to output the predetermined torque, and causes the inverter to output the application voltage with a second amplitude obtained by multiplying a second maximum by a second ratio, causes the motor to rotate at a second speed, and causes the motor to output the predetermined torque, wherein an amplitude of the application voltage takes at most the first maximum when the motor outputs the predetermined torque at the first speed, wherein the amplitude of the application voltage takes at most the second maximum when the motor outputs the predetermined torque at the second speed, wherein the second speed is higher than the first speed, wherein the second ratio is smaller than the first ratio, wherein the first ratio is defined as a ratio of amplitude of the application voltage to a possible maximum amplitude of the application voltage causing the motor to rotate at the first speed when the motor outputs the predetermined torque, and wherein the second ratio is defined as a ratio of amplitude of the application voltage to a possible maximum amplitude of the application voltage causing the motor to rotate at the second speed when the motor outputs the predetermined torque.

6. The motor control device according to claim 5,
wherein the second speed is a maximum that the rotation speed of the motor takes when the motor outputs the predetermined torque.

* * * * *